US010388975B2

(12) United States Patent
Sakamoto et al.

(10) Patent No.: US 10,388,975 B2
(45) Date of Patent: Aug. 20, 2019

(54) TEMPLATE-BASED METHODS OF MAKING AND USING CERAMIC SOLIDS

(71) Applicant: Board of Trustees of Michigan State University, East Lansing, MI (US)

(72) Inventors: Jeffrey Sakamoto, East Lansing, MI (US); Travis Thompson, Apple Valley, CA (US); Ezhiyl Rangasamy, Oak Ridge, TN (US); Daniel A. Lynam, Walled Lake, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 1374 days.

(21) Appl. No.: 14/169,758

(22) Filed: Jan. 31, 2014

(65) Prior Publication Data

US 2016/0293988 A1 Oct. 6, 2016

Related U.S. Application Data

(60) Provisional application No. 61/759,237, filed on Jan. 31, 2013.

(51) Int. Cl.
*H01M 8/1253* (2016.01)
*H01M 10/0525* (2010.01)
(Continued)

(52) U.S. Cl.
CPC ........ *H01M 8/1253* (2013.01); *C01G 23/005* (2013.01); *C01G 25/006* (2013.01);
(Continued)

(58) Field of Classification Search
None
See application file for complete search history.

(56) References Cited

U.S. PATENT DOCUMENTS 7,282,295 B2 10/2007 Visco et al.
9,093,717 B2 7/2015 Sakamoto et al.
(Continued)

FOREIGN PATENT DOCUMENTS

JP 6-219726 A 8/1994

OTHER PUBLICATIONS

International Search Report and Written Opinion received for PCT Patent Application No. PCT/US2012/046469, dated Jan. 31, 2013, 7 pages.

(Continued)

*Primary Examiner* — Christopher P Domone
(74) *Attorney, Agent, or Firm* — Clark IP Law, PLC

(57) ABSTRACT

Various embodiments relate to a method comprising forming a template from a template precursor, wherein the template contains an entrapped ceramic precursor, which can be further processed to form a ceramic solid, such as an oxide ceramic solid. In one embodiment, the template precursor is a hydrogel precursor and the template is a hydrogel template. The hydrogel template can include, for example, agarose, chitosan, alginate or a photo-initiating receptive hydrogel template such as a functionalized poly(ethylene glycol). Various devices, including electrolyte interfaces and energy storage devices, as well as thermoelectric devices are also provided. In one embodiment, the oxide ceramic solid is a cubic garnet having a nominal formula of $Li_7La_3Zr_2O_{12}$ (LLZO).

23 Claims, 14 Drawing Sheets
(6 of 14 Drawing Sheet(s) Filed in Color)

(51) Int. Cl.

| | | |
|---|---|---|
| C04B 35/624 | (2006.01) | |
| C01G 25/00 | (2006.01) | |
| C04B 35/50 | (2006.01) | |
| C01G 23/00 | (2006.01) | |
| C01G 51/00 | (2006.01) | |
| C01G 53/00 | (2006.01) | |
| C04B 35/01 | (2006.01) | |
| C04B 35/486 | (2006.01) | |
| C04B 35/495 | (2006.01) | |
| C04B 35/505 | (2006.01) | |
| C04B 35/634 | (2006.01) | |
| C04B 35/636 | (2006.01) | |
| C04B 35/638 | (2006.01) | |
| H01M 10/0562 | (2010.01) | |
| H01M 8/124 | (2016.01) | |

(52) U.S. Cl.
CPC ............ *C01G 51/42* (2013.01); *C01G 51/66* (2013.01); *C01G 51/68* (2013.01); *C01G 53/54* (2013.01); *C04B 35/01* (2013.01); *C04B 35/486* (2013.01); *C04B 35/495* (2013.01); *C04B 35/50* (2013.01); *C04B 35/505* (2013.01); *C04B 35/624* (2013.01); *C04B 35/634* (2013.01); *C04B 35/636* (2013.01); *C04B 35/638* (2013.01); *C04B 35/6365* (2013.01); *H01M 10/0562* (2013.01); *C01P 2002/30* (2013.01); *C01P 2002/50* (2013.01); *C01P 2002/72* (2013.01); *C01P 2002/76* (2013.01); *C01P 2004/02* (2013.01); *C01P 2006/40* (2013.01); *C04B 2235/3201* (2013.01); *C04B 2235/3203* (2013.01); *C04B 2235/3206* (2013.01); *C04B 2235/3215* (2013.01); *C04B 2235/3217* (2013.01); *C04B 2235/3224* (2013.01); *C04B 2235/3227* (2013.01); *C04B 2235/3229* (2013.01); *C04B 2235/3244* (2013.01); *C04B 2235/3251* (2013.01); *C04B 2235/3286* (2013.01); *C04B 2235/764* (2013.01); *C04B 2235/94* (2013.01); *H01M 2008/1293* (2013.01); *H01M 2300/0077* (2013.01); *Y02E 60/525* (2013.01); *Y02P 70/56* (2015.11)

(56) References Cited

U.S. PATENT DOCUMENTS

| | | | |
|---|---|---|---|
| 2004/0099843 A1 | 5/2004 | Costa et al. | |
| 2006/0088470 A1* | 4/2006 | Larsson | ............... B01J 20/0211 |
| | | | 423/702 |
| 2007/0167534 A1 | 7/2007 | Coronado et al. | |
| 2010/0047696 A1 | 2/2010 | Yoshida et al. | |
| 2010/0203383 A1 | 8/2010 | Weppner | |
| 2011/0053001 A1 | 3/2011 | Babic et al. | |
| 2011/0053002 A1 | 3/2011 | Yamamura et al. | |
| 2011/0248417 A1* | 10/2011 | Wang | ................... C04B 28/344 |
| | | | 264/45.3 |
| 2013/0344416 A1 | 12/2013 | Sakamoto et al. | |

OTHER PUBLICATIONS

Van Ginneken et al., "Synthesis, Characterisation and Applications of Silica Aerogels", 6th International Symposium on Supercritical Fluids, Versailles, Apr. 2003, pp. 28-30.

Janani et al., "Synthesis of Cubic Li7La3Zr2O12 by Modified Sol-Gel Process", Ionics, vol. 17, No. 7, Sep. 2011, pp. 575-580.

Kokal et al., "Sol-gel Synthesis and Lithium Ion Conductivity of Li7La3Zr2O12 with Garnet-related Type Structures", Solid State Ionics, vol. 185, No. 1, Mar. 2011, pp. 42-46.

Kotobuki et al., "Compatibility of Li7La3Zr2O12 by Solid Electrolyte to All-Solid-State Battery Using Li Metal Anode", Journal of the Electrochemical Society, vol. 157,No. 10, 2010, pp. A1076-A1079.

Wolfenstine et al., "Electrical and Mechanical Properties of Hot-Pressed Versus Sintered LiTi2(PO4)3", Solid State Ionics, vol. 180, No. 14-16, Jun. 2009, pp. 961-967.

Non Final Office Action received for U.S. Appl. No. 13/476,843, dated Jul. 17, 2014, 9 pages.

Final Office Action received for U.S. Appl. No. 13/476,843, dated Dec. 31, 2014, 8 pages.

* cited by examiner

TEMPLATE-BASED METHODS OF MAKING AND USING CERAMIC SOLIDS

This application claims the benefit under 35 U.S.C. 119 (e) of U.S. Provisional Application Ser. No. 61/759,237, filed Jan. 31, 2013, hereby incorporated by reference in its entirety.

STATEMENT OF GOVERNMENT RIGHTS

This invention was made with government support under W911NF-10-2-0089 awarded by the U.S. Army Research Office and under DE-SC0001054 awarded by the U.S. Department of Energy. The government has certain rights in the invention.

BACKGROUND

Portable or independent energy sources have wide application in many areas of technology, such as in energy storage devices and thermoelectric devices.

SUMMARY

The various embodiments described herein provide for template-based methods of making various materials, such as ceramic solids, (e.g., oxide ceramic solids) having the desired properties and/or which can be further processed to have the desired properties, for use in a variety of products, including, for example, energy storage and thermoelectric devices.

In one embodiment, temporary immobilization of a cation in a solid network formation is provided. When the formation is heated, only a single (desired) crystallographic phase is formed instead of multiple phases.

Use of solution-based technology allows for molecular level mixing of precursor components. In embodiments utilizing water as the solvent, additional advantages are realized in terms of the ability to dissolve a broader array of compounds. In embodiments utilizing non-toxic hydrogels, the template is bio-compatible. The various methods described herein produce a novel product useful in a variety of devices in an efficient and cost-effective manner.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1A:
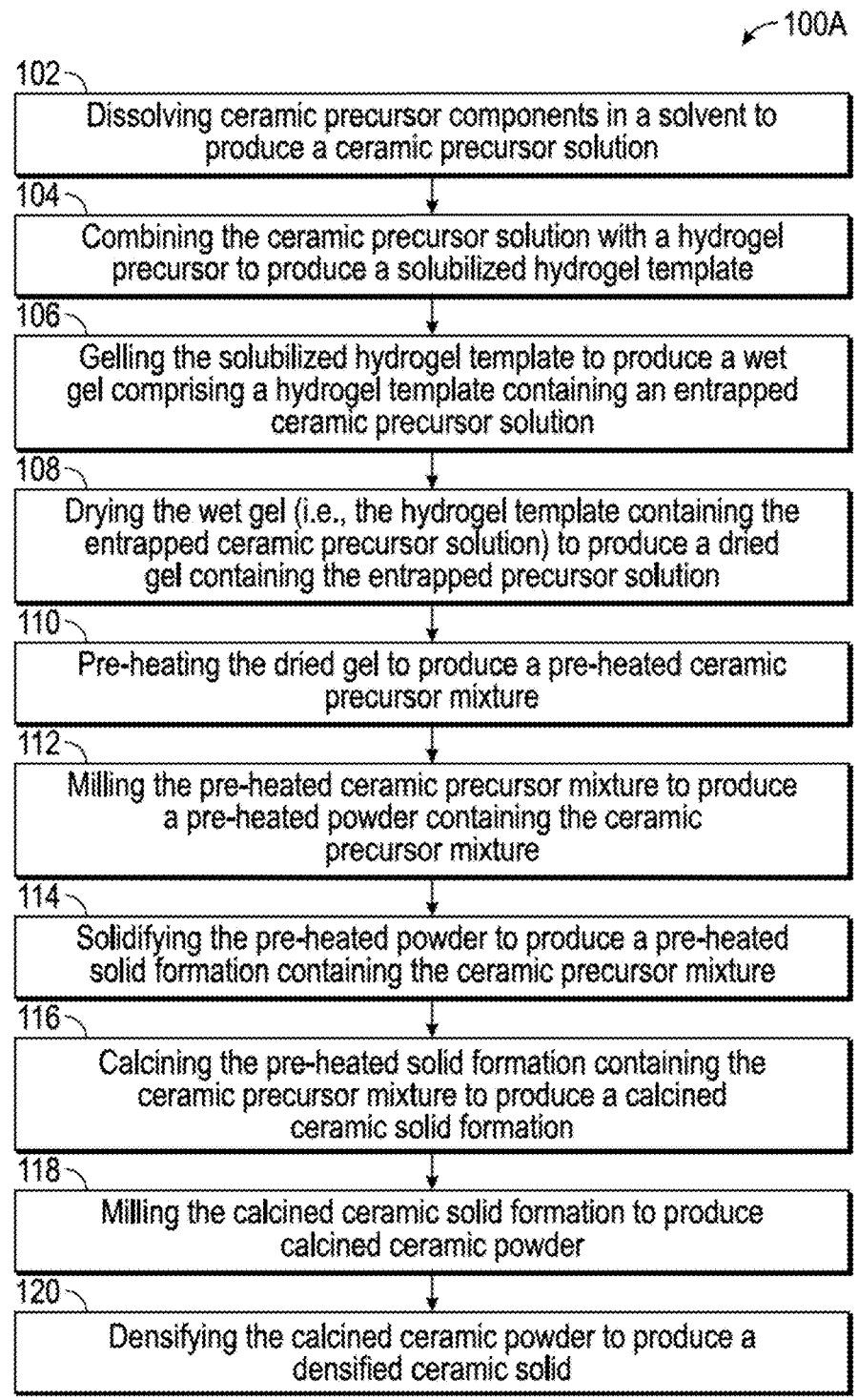
FIG. 1A is a process diagram of a one-step template-based process for producing a ceramic solid in one step according to an embodiment.

In the following detailed description of embodiments of the invention, embodiments are described in sufficient detail to enable those skilled in the art to practice them, and it is to be understood that other embodiments may be utilized and that chemical, structural and procedural changes may be made without departing from the spirit and scope of the present subject matter. The following detailed description is, therefore, not to be taken in a limiting sense, and the scope of embodiments of the present invention is defined only by the appended claims.

There is a need to develop materials and devices that allow for safe, high performance energy storage and thermoelectric devices.

The various embodiments described herein provide for template-based methods of making various materials, such as ceramic solids, (e.g., oxide ceramic solids) having the desired properties and/or which can be further processed to have the desired properties, for use in a variety of products, including, for example, energy storage devices, such as batteries, fuel cells, semi-fuel cells, and the like, and thermoelectric devices, such as thermoelectric generators.

The term "template precursor" as used herein refers to one or more materials in solid, liquid or solid-liquid form that can be solubilized to form a solubilized template precursor. A hydrogel precursor is one example of a template precursor.

The term "solubilized template precursor" as used herein refers to a mixture of a template precursor and a solution, such as a ceramic precursor solution. A solubilized template precursor can be subjected to a gelation process as defined herein, to form a template. A solubilized hydrogel precursor is one example of a solubilized template precursor.

The term "gelled" or "gelation process" as used herein refers to a process of producing a template (containing a solid network formation) from a template precursor. The gelation process can occur as a result of formation by weak interactions, such as intermolecular forces or hydrogen bonding and/or strong interactions, such as covalent or ionic bonding and any combination thereof. A gelation process is to be distinguished from a "template-based process," defined below, which is a process for producing a ceramic solid.

The term "solid network formation" as used herein refers to a network of discrete particles, polymers (including, for example, a three dimensional interconnected network), or a combination thereof.

The term "templated gel" or "template" or a "ceramic-forming template" as used herein refers to a template (e.g., hydrogel template) containing an entrapped precursor solution. A template is formed in a template-based process (defined below). A template can be used as a sacrificial component for entrapment of one or more precursor components in the formation of solid ceramics. As such, a template can be sacrificed, e.g., burned off, during processing, such as during subsequent heat treatment processes. A "templated ceramic gel" (e.g., a templated oxide ceramic gel) is one type of templated gel (i.e., template).

The term "ceramic powder" as used herein refers to a crystalline or partially crystalline ceramic solid as well as an amorphous ceramic solid comprising one or more particles no larger than about 100 microns. An "oxide ceramic powder" is one example of a ceramic powder.

The term "precursor solution" as used herein refers to a solution comprising one or more solvents and precursor components. The precursor components can include, but are not limited to, ceramic precursors such as cations, anions, polyatomic ions, dispersed solids and any combination thereof.

The term "dispersed solid" as used herein refers to a solid which will not settle out of a liquid (e.g., solvent) within a relevant time frame (e.g., before gelation of a template). Although a dispersed solid is typically sub-micron in size, the actual size is dependent on the particular liquid and solid being use.

The term "template-based process" as used herein refers to a process which is a combination of a gelation process (defined above) and a subsequent or substantially simultaneous precursor entrapment process (e.g., precursor solution entrapment), followed by further processing steps to produce a solid, such as a ceramic solid. This is in contrast to a "non-aqueous solution-based reaction" as defined in U.S. patent application Ser. No. 13/476,843 filed on May 21, 2012 (hereinafter "'843 application") which requires a chelation agent and includes a gelation reaction ("sol gel process") and a condensation reaction to produce an oxide ceramic solid, as those terms are defined in the '843 application.

The term "ceramic solid" as used herein refers to an inorganic, non-metallic solid material that can contains at least two elements, one of which is a non-metal or a nonmetallic elemental solid. If more than two elements are involved, the material is referred to as "mixed" or "complex." Such materials may have a variety of compositions, porosities, and microstructures, to meet specific property requirements. Such materials may be crystalline (e.g., polycrystalline), partially crystalline or amorphous.

The term "oxide ceramic" or "oxide ceramic solid" as used herein refers to a type of ceramic solid in which one of the elements in the ceramic solid is oxygen. A "single oxide ceramic" comprises two elements. A "mixed oxide ceramic" or "complex oxide ceramic" comprises three or more elements.

The term "garnet" as used herein refers to the atomic structure of crystalline or partially crystalline oxide ceramic solid. The term "cubic garnet" as used herein refers to a garnet having a substantially cubic shape. The space group for cubic garnet is $Ia\bar{3}d$. The term lithium lanthanum zirconate "LLZO" or $Li_7La_3Zr_2O_{12}$ as used herein refers to a cubic garnet having a nominal formula of $Li_7La_3Zr_2O_{12}$ in combination with a dopant, e.g. a supervalent dopant.

The term "drying" as used herein refers to removal of a majority of liquid from a material, such as a ceramic gel, to form a dried ceramic gel. Trace amounts of liquid may remain in a material which has been dried.

The term "pre-heating" as used herein refers to a step in which heat is used after or instead of an evaporation step to sacrifice the template and to remove the majority of solvent remaining in a material. Pre-heating, therefore, inherently includes an amount of drying.

The term "calcine" or "calcining" as used herein refers to heating a material to a high temperature which is below the melting point, to produce particles, such as a powder.

The term "pre-calcine" or "pre-calcining" as used herein refers to a step which is not only useful for removing the majority of solvent that remains in a material after a room temperature drying step, but which is useful for sacrificing the template and can be useful as a stand-alone treatment or subsequent processing.

The term "solidifying" as used herein refers to a process for compacting a powder into a solid formation having variable densities. Cold-pressing is just one example of a solidifying process.

The term "densification" as used herein refers to a process for substantially completely densifying a solid formation to produce a densified solid having minimal or no porosity, such as a densified pellet. Sintering is just one example of a densification process in which a suitable amount of heat and/or pressure for a suitable amount of time is applied to minimize porosity The term "electrochemical cell" as used herein refers to a device capable of deriving electrical energy from chemical reactions, or capable of facilitating chemical reactions through the introduction of chemical energy.

The term "electrode" as used herein refers to an electrochemical electrode, and can also refer to either an anode or a cathode. An anode generally refers to the electrode at which electrons leave the cell and oxidation occurs, and a cathode generally refers to the electrode at which electrons enter the cell and reduction occurs during discharge. In some examples of an electrochemical cell, each electrode can become either the anode or cathode, depending on the direction of current through the cell.

The term "battery" as used herein refers to one or more electrochemical cells which convert stored chemical energy into electrical energy. The term can refer to primary batteries (generally one use, disposable), or secondary batteries (rechargeable).

The term "fuel cell" as used herein refers to one or more electrochemical cells, each having an anode and a cathode, which convert chemical energy from fuel into electric energy. Reactants flow into the cell, and reaction products flow out of the cell.

The term "semi-fuel cell" as used herein refers to a device that is generally part fuel cell and part battery.

The term "electrolyte" as used herein refers to any substance that conducts ions with minimal or no conduction of electrons. In a fuel cell, battery, or semi-fuel cell, one or more electrolytes can separate the anode and cathode, and can allow the conduction of ions from one half-cell to another half-cell.

There is a need to develop materials and apparatus that allow for safe, high performance energy storage and/or thermoelectric operation. In one embodiment, a template-based process is provided, which includes a gelation process combined with, in one embodiment, a precursor solution entrapping step to form a wet gel comprising a template containing an entrapped precursor solution, which, in turn, is further processed to produce a desired product, such as a ceramic solid (e.g., an oxide ceramic solid).

Any suitable gelation process can be used to produce a template from a template precursor. In one embodiment, the gelation process can occur in a molten mixture (such as a molten hydrogel precursor) upon cooling from an elevated temperature (e.g., agarose). Additionally or alternatively, a template precursor can be gelled with the addition of cations (e.g., alginate). If the template precursor comprises chitosan, a solid network formation can additionally or alternatively occur upon exposure to high pH, e.g., basic conditions by adding a suitable base, such as any strong base, such as an organic base (e.g., sodium hydroxide, ammonia, and the like). If the template precursor comprises poly(ethylene glycol) dimethacrylate (e.g., PEG) and a photoinitiator, a solid network formation can additionally or alternatively occur upon exposure to ultraviolet (UV) light. In one embodiment, the gelation process is a solution-based technique adapted to provide intimate molecular level mixing of components in a precursor solution, such as a ceramic precursor solution.

In various embodiments, the gelation process can either be performed in tandem with the precursor solution entrapping step or prior to the entrapping step. Regardless of which method is used, the template-based process for producing a template from a template precursor, such as a hydrogel template, eliminates the need for additional thermal energy to diffuse precursor components together during calcination since intimate mixing from the precursor solution is maintained by the template. In this way, activation of other competing phases is avoided as the precursor components become more physically separated, which may otherwise produce impurities. Additionally, phase segregation during solvent evaporation is avoided. While not wishing to be bound to this proposed theory, it is likely that the entrapping step is a physical mechanism, rather than a chemical mechanism.

In one embodiment, the precursor solution is formed in a suitable solvent capable of allowing a template to form for use as described herein. In one embodiment, the solvent comprises a single solvent or combination of solvents. In one embodiment, the solvent is a polar solvent. In one embodiment, the polar solvent is an organic polar solvent, such as a non-alcohol polar solvent. In one embodiment, the polar solvent is an aqueous solvent, containing at least some, up to substantially all water. Other components in the aqueous solvent can include, but are not limited to acids (e.g., acetic acid). In one embodiment, the polar solvent is water, such as deionized water, reverse osmosis water, distilled water or tap water. In one embodiment, the water is at least about 90% pure or higher up to about 99.9% pure, including any range therebetween. With use of a polar solvent, it is now possible to use a variety of precursor components for dissolution that are otherwise insoluble in an organic medium.

Any suitable precursor components can be used depending on the desired intermediate and final products (e.g., wet gel, dried gel, pre-heated precursor mixture, pre-heated solid, calcined solid formation, densified solid, such as a densified ceramic solid, and the like). Such precursor components include, but are not limited to: ceramic precursors, such as any simple or complex metal salt precursors that are soluble in the solvent, such as nitrates, acetates, halides, sulfates, carbonates, hydroxides, oxalates, citrates, phosphates or any other salts of an organic and/or a mineral acid; dispersed solids, such as sub-micron powders, nanoparticles, or quantum dots of metal oxides, metals or nonmetallic elemental solids, or organometallic compounds, such as alkoxides. In one embodiment, the end product is a ceramic solid containing a variety of simple and/or complex metal salts.

Any suitable number of compounds can be used as precursor components to form the desired final product. In one embodiment, a single compound is used. In one embodiment, at least two compounds are used. In one embodiment, three or more compounds are used. In one embodiment a lithium compound, a lanthanum compound and/or a zirconium compound are used.

In one embodiment, three different compounds are used. In this embodiment, a zirconium compound can be used as a first, second and/or third compound. In one embodiment, the zirconium compound is selected from organozirconium compounds, zirconium alkoxides (e.g., zirconium n-propoxide, zirconium n-butoxide, zirconium t-butoxide, zirconium ethoxide), zirconium tetrahydrates, zirconium carbonates, zirconium silicates, zirconium acetates, zirconium halides, zirconacene compounds, and/or a zirconium salts of an organic and/or a mineral acid (e.g., zirconium sulfate).

In the embodiment in which three different compounds are used, a lithium compound can be used as a first, second and/or third compound. In one embodiment, the lithium compound is selected from organolithium compounds, lithium oxides (e.g., lithium t-butoxide, lithium alkoxide), lithium acetates (e.g., lithium acetate dehydrate), lithium hydroxides, lithium halides (e.g., lithium bromide), lithium hydrides (lithium borohydride, lithium iodide, etc.) lithium nitrates (e.g., lithium nitrate hydrate), lithium oxalates and/or lithium salts of an organic and/or a mineral acid.

In generating a ceramic solid, the mole ratios of the cations, such as lithium, lanthanum, and zirconium in the starting materials (with respect to the total number of moles of the cations in the starting materials) can be the same or different than the mole ratios of the cations in the ceramic solid produced. In one embodiment, the mole percent of the first cation (e.g., lithium) can be between about 40% to about 70%, about 50% to about 62%, or about 54% to about 58% (with respect to the total number of moles of all cations in the starting materials), including any range there between. In one embodiment, the mole percent of the second cation (e.g., lanthanum) in the starting materials can be between about 10% to about 40%, about 18% to about 30%, or about 22% to about 26% (with respect to the total number of moles of all metals in the starting materials), including any range there between. In one embodiment, the mole percent of the third cation (e.g., zirconium) can be between about 5% to about 35%, about 13% to about 27%, or about 18% to about 22% (with respect to the total number of moles of all metals in the starting materials), including any range there between.

The compounds and the solvent can be stirred together prior to combining the other compounds. The stirring can occur for any suitable amount of time, such as for about 1 minute to about 60 minutes, including any range there between, prior to combining the subsequent compounds.

In one embodiment, the precursor components and an additional component, such as sucrose, can be dissolved into a solvent, such as a polar solvent, in the appropriate stoichiometries, to produce a precursor solution. Thereafter, a template precursor is added, such as powdered agarose, to produce a mixture of a template precursor and precursor solution (e.g., a mixture of a template precursor and a solubilized template precursor). The solubilized template precursor is then heated sufficiently to melt the solubilized template precursor (e.g., agarose) and then cooled to form the hydrogel template. As the template precursor forms a template, substantially all the precursor solution containing the ceramic precursors is entrapped within its pores. Any amount of precursor solution which does not become entrapped can be discarded. In one embodiment, the template is formed without the additional component, such as sucrose. In one embodiment, the template is a hydrogel template. Example 1 provides one example of a solubilized hydrogel precursor in a solution that does not contain ceramic precursors.

Any suitable template precursor capable of being gelled to form a template can be used. The template precursor may inherently contain one or more functional groups, i.e., be functionalized (e.g., —OH) and/or may be modified with one or more functional groups. In one embodiment, the functionalization includes forming a dimethacrylated compound (e.g., poly(ethylene) glycol dimethacrylate). Other functional groups may be added to produce other compounds, such as, for example, a diacrylated compound, and so forth.

In one embodiment, the template precursor is highly porous with porosities greater than about 90%. In one embodiment, the template precursor possesses sub-micron pore size once gelled. In one embodiment, the template precursor is non-toxic and/or bio-compatible and/or edible. In one embodiment, the template precursor is a linear polysaccharide. In one embodiment, chitosan or alginate is used as the template precursor. In one embodiment, the template precursor is a linear and/or branched and/or multi-armed polymer. Examples of such template precursors include hydrogels, such as, but not limited to, linear polyethylene glycol, branched polyethylene imine, 4-armed polyethylene glycol, 6-armed polyethylene glycol, and the like.

In one embodiment, the template precursor is a seaweed derivative, such as agarose. In one embodiment, an additional "pore size distribution-narrowing" component is added to the template precursor prior to gelation to increase the relative fraction of microporosity in the resulting template. In one embodiment, the additional component is a component with a sufficiently high molecular weight molecule capable of providing steric hindrance such that the solubilized template precursor is well-dispersed. In this way, agglomeration is prevented. In one embodiment, the additional component has a molecular weight of at least 342 g/mol. In one embodiment, the additional component is a simple sugar, including, but not limited to, fructose, glucose and/or galactose, and the like, and/or a complex sugar. In one embodiment, sucrose is used as the added component, either alone or in combination with one or more other additional components. It is also possible to use a pore size distribution-narrowing component with other template precursors.

In the various embodiments described herein the template is organic. In one embodiment, the volume fraction of organic compounds in the template is between about 0.1 to about 10 percent (%), including any range there between, with the remaining volume porosity-filled by a liquid or a precursor-containing liquid.

In one embodiment, the template precursor is poly(ethylene glycol) dimethacrylate (PEG). Gelling of PEG and other free-radical photopolymerizable template precursors, may be achieved with use of a photoinitiator, through exposure of the template precursor and photoinitiator to light, such as ultraviolet (UV) light. Photo-induced gelation can facilitate the gelation of large volumes of free-radical photopolymerizable template precursors in a single batch. In one embodiment, the photoinitiator comprises one or more materials in solid, liquid or solid-liquid form which enables gelation by exposure to light. Any suitable photoinitiator can be used as is understood by those skilled in the art. See, for example, http://en.wikipedia.org/wiki/Photoinitiator, which is hereby incorporated by reference herein in its entirety. In one specific embodiment, 2-hydroxy-4'-(2-hydroxyethoxy)-2-methylpopiophenone is used as a photoinitiator.

In various embodiments, the gelation and entrapment portions of the template-based process are not sensitive to the effect of the environment, such as moisture. In various embodiments, the gelation and entrapment portions of the template-based process are performed in the open air rather than in a controlled environment, although a controlled environment can be used if desired. In one embodiment, the gelation and entrapment portions of the template-based process are performed in two separate steps, with the gelation process performed in open air and the precursor solution entrapping step performed in a controlled environment or vice versa.

The gelation and/or entrapment portions of the template-based process can be performed at any suitable temperature, such as, for example, room temperature (i.e., ambient temperatures), or a few degrees above or below room temperature. In one embodiment, these portions of the template-based process can be performed at any temperature between the freezing and boiling points of the solvent used. In one embodiment, these portions of the template-based process are performed at from about −15 to about 50° C.

The gelation and entrapment portions of the template-based process result in a wet gel comprising a hydrogel template containing an entrapped ceramic precursor solution with no chelating agent, thus reducing the expense of the process while increasing the efficiency.

In one embodiment, the wet gel can be dried, preheated (e.g., pre-calcined), optionally milled and/or solidified prior to being subject to further processing as discussed in FIGS. 1A, 1B, 2A and 2B below to produce the phase of interest (i.e., ceramic solid). Such processes include, but are not limited to, calcination, optional additional milling and densification. Although optional, use of milling at one or more points in the process can improve phase purity of the final product.

In one embodiment, the wet gel is not subject to a drying step prior to further processing, such as pre-calcining. For thermally-crosslinked hydrogels (e.g., agarose) a drying step may be included to prevent melting during the pre-calcining step. However, for non-thermally cross-linked hydrogels (e.g., PEG and, likely, chitosan), the drying step may, optionally, be omitted, although some drying inherently occurs during the pre-heating step regardless. In embodiments in which drying is accomplished by heating, the pre-heating step and drying step are essentially one in the same.

Figure 1B:
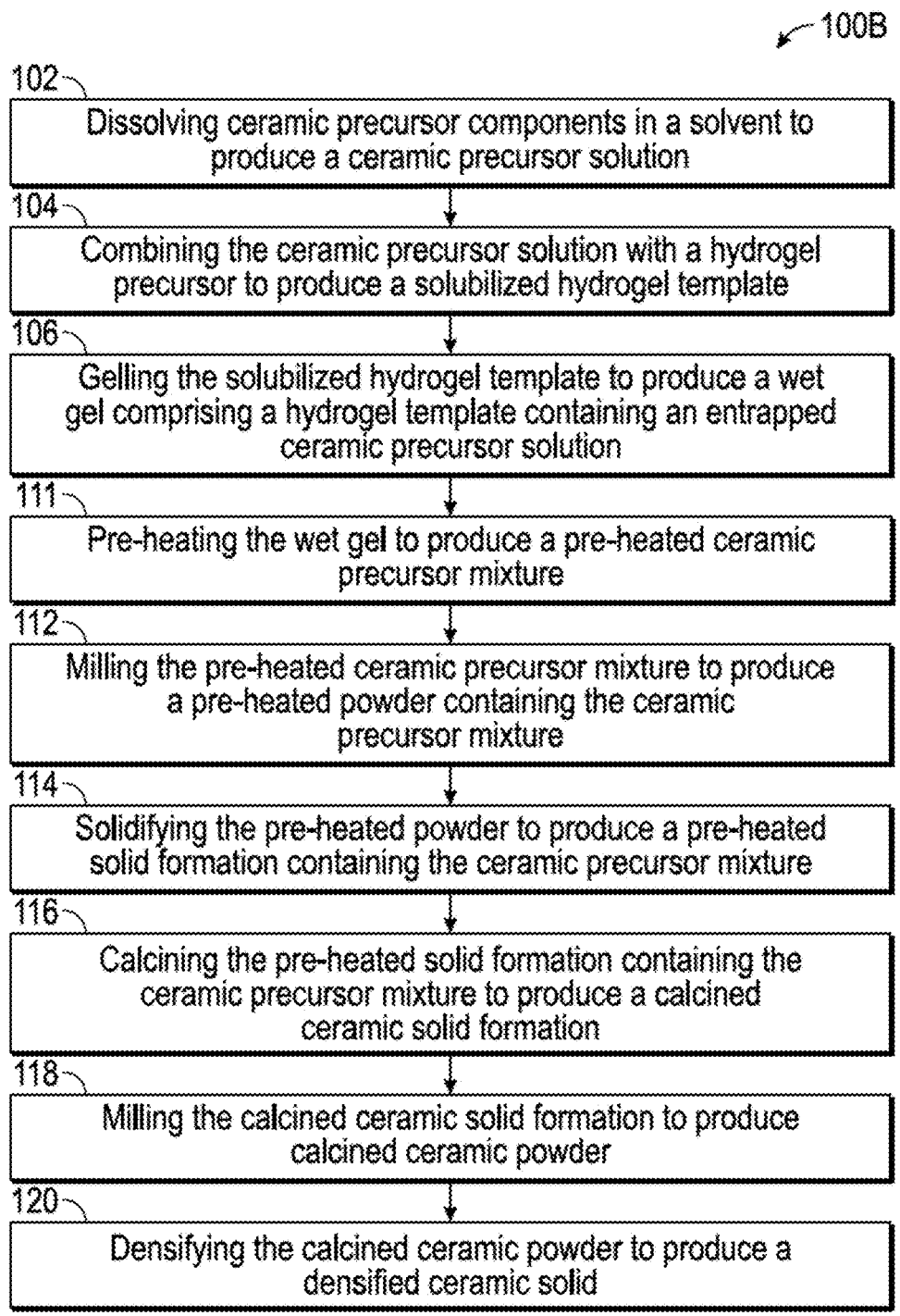
FIG. 1B is a process diagram of a one-step template-based process for producing a ceramic solid in one step without a drying step according to an embodiment.
Figure 2A:
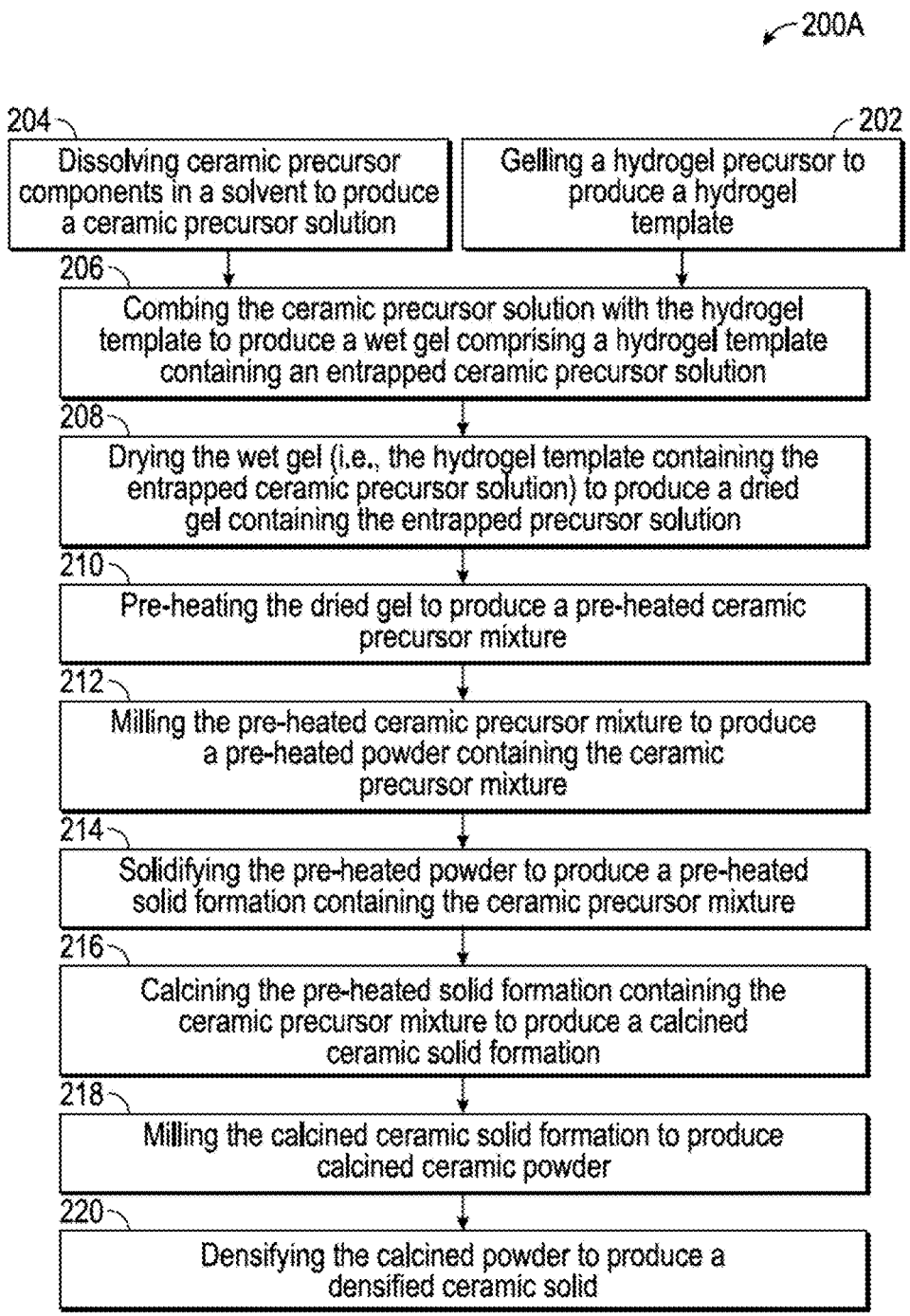
FIG. 2A is a process flow diagram of a two-step template-based process for producing a ceramic solid in two steps according to an embodiment.
Figure 2B:
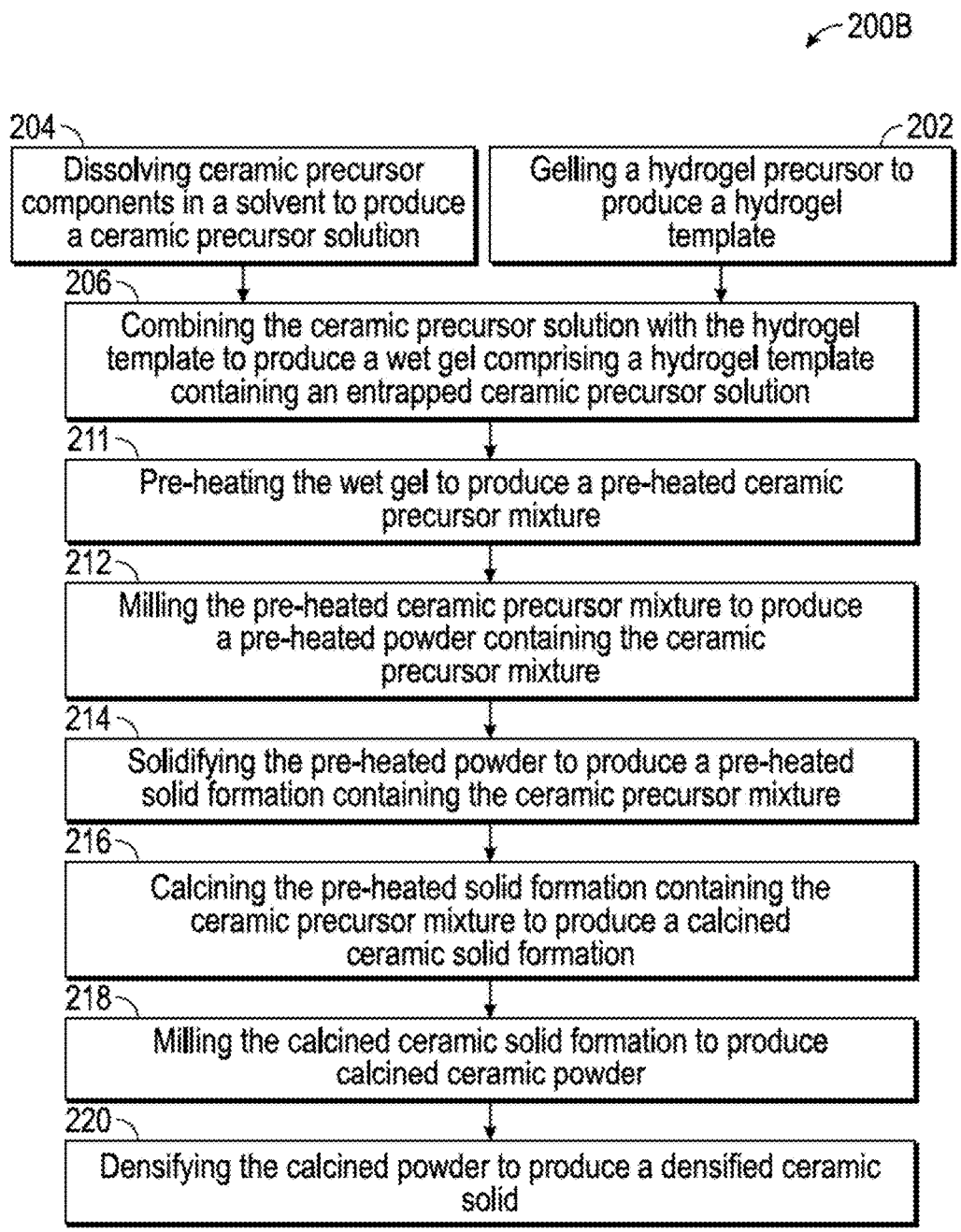
FIG. 2B is a process diagram of a two-step template-based process for producing a ceramic solid in two-step without a drying step according to an embodiment.

In one embodiment, the hydrogel is PEG and the process follows FIG. 1B or FIG. 2B, such that it is performed without a drying step. In one embodiment, the PEG wet gel is pre-calcined without the drying step. In other embodiments the PEG wet gel may be dried as is described herein for other hydrogels. However, omission of the drying step reduces process time by several days, such as up to 4 days, up to 3 days, up to 2 days, up to 1 day (24 hrs), such as by at least one-half day (12 hrs). In one embodiment, the process time is reduced by at least 50%, such as from about 1% to about 50%, or from about 5% to about 30%, or from about 10% to about 25%, or from about 15% to about 33%, or from about 25% to about 33%, or from about 33% to about 50%, including any range there between. In one embodiment, the process time may be decreased more than 50%. In one embodiment, the process time is reduced by at least 2000 min, such as from one minute to about 2000 min, such as from about 500 min to about 2000 min, such as about 1000 min to about 2000 min, such as about 1500 min to about 2000 min, including any range therebetween. As discussed in Example 10, the results for LLZO are comparable to the results obtained in Example 9, although the LLZO is different because it contains different types and amounts of impurities. The results using PEG are discussed in more detail in Example 9. It is possible that process times may be reduced as much or even more with other types of photoinitiating-receptive template precursors.

The drying step can include an evaporation step at or above room temperature which produces an air-dried product. In one embodiment, the evaporation occurs at room temperature and ambient air pressure. As the solvent evaporates causing the pores to collapse as a result of capillary forces, the precursor components, such as salts, precipitate out of solution, due to solubility limits inside the pores of the hydrogel template. In one embodiment, the precipitation occurs within micropores (less than 5 nm) and mesopores (less than about 50 nm), the size of the crystallites is constrained, thus preserving the precursor solution mixing in the dry state.

In one embodiment, the resulting dried gel containing a ceramic precursor mixture is subject to a pre-heating step in any suitable atmosphere (e.g., air) at any suitable temperature to remove residual solvent and/or organic compounds in the ceramic precursor mixture. In one embodiment, the pre-heating step is a pre-calcining step. Such a step is not only useful for removing the majority of any solvent that remains after a drying step, but can also be useful as a stand-alone treatment.

In one embodiment, the dried gel is exposed to or pre-heated at elevated temperatures such as between about 100° C. and about 500° C., including any range there between, although the embodiments are not so limited. The pre-heating can occur for any suitable time period. In one embodiment, the time period is between about 1 minute and about 5 hours, including any range there between. In one embodiment, the time period is between about 1 hour and about 3 hours, including any range there between.

The resulting pre-heated or pre-calcined precursor mixture can optionally be further processed by any desired means. In one embodiment, the precursor mixture is milled in a milling process which includes, but is not limited to, ball milling, tumbler milling, mixer milling, planetary milling and/or high energy milling. The milling can occur for any suitable time period sufficient to sufficiently mill the powder, including, for example, about 1 minute, 2 minutes, 3 minutes, 4 minutes, 5 minutes, 10 minutes, or more, such as for about 60 minutes, including any range there between. The milling can be at low energy (e.g., mortar and pestle) and at room temperature. Use of milder conditions can help to avoid or reduce undesirable results, such as chemical contamination from the mill. In other embodiments, the milling can be at high energy. High energy milling can be performed at high temperatures, such as no less than about 100° C. High energy milling can cause an increase in temperature of the resulting powder.

In one embodiment, it is a combination of pre-heating and milling that produces the pre-heated powder containing a precursor mixture. In one embodiment, there is no pre-heating step and the dried gel containing the precursor mixture is milled to produce a non-pre-heated powder containing the precursor mixture.

The resulting pre-heated (or non-pre-heated) powder containing the precursor mixture can be further processed in any suitable manner to produce the desired results. In one embodiment, the powder is solidified, such as with cold-pressing to produce a solid formation containing the precursor mixture (hereinafter "solid formation").

In one embodiment the solid formation is processed in any suitable manner to produce the desired product. In one embodiment, the solid formation is calcined to produce a calcined solid formation. Calcination can occur for any suitable time period and under any desired temperature configured to produce the desired product. In one embodiment, during calcination, the solid formation is exposed to a temperature sufficiently elevated to allow for adequate densification to occur during a subsequent densification process. The calcination conditions are system dependent and will vary accordingly. In one embodiment, the solid formation is heated to a temperature of between about 650 and about 1200° C., such as between about 850 and about 1150° C., including any range there between, or to a temperature of at least 1000° C. during calcination. Calcination can occur in any suitable atmosphere, such as in an inert atmosphere (e.g., argon), oxidizing atmosphere (e.g., air), or a slightly reducing atmosphere (e.g., nitrogen).

In one embodiment, the solid formation is exposed to elevated temperatures for a suitable period of time to allow calcination to occur. In one embodiment, the time period is between about 1 minute and about 5 hours, including any range there between. In one embodiment, the time period is between about 1 hour and about 3 hours, including any range there between.

Example embodiments include, but are not limited to, calcining a pre-heated powder containing a NCO precursor mixture to produce a calcined NCO "solid formation" at temperatures between about 650 and about 750° C., such as between about 680 and about 720° C., such as about 695 to about 705° C., including any range there between. In one embodiment, calcining a pre-heated powder containing a LMNO precursor mixture to produce a calcined LMNO solid formation at temperatures between about 400 and about 500° C., such as between about 430 and about 470° C., such as between about 445 and about 455° C., including any range there between.

The resulting calcined solid formations can optionally be milled prior to being densified. In one embodiment, the precursor mixture is milled in a milling process which includes, but is not limited to, ball milling, tumbler milling, mixer milling, planetary milling and/or high energy milling. The milling can occur for any suitable time period sufficient to sufficiently mill the powder, including, for example, about 1 minute, 2 minutes, 3 minutes, 4 minutes, 5 minutes, 10 minutes, or more, such as for about 60 minutes, including any range there between. The milling can be at low energy (e.g., mortar and pestle) and at room temperature. Use of milder conditions can help to avoid or reduce undesirable results, such as chemical contamination from the mill. In other embodiments, the milling can be at high energy. High energy milling can be performed at high temperatures, such as no less than about 100° C. High energy milling can cause an increase in temperature of the resulting powder.

In various embodiments, the calcined solid formation or the calcined particles, such as calcined powder, are densified in any suitable manner, such as with pressing, sintering or heating (i.e., heat-treating) or a combination thereof, either simultaneously or sequentially. As such, the calcined solid formation or calcined particles can be formed into any suitable shape, such as, for example, a wafer, pellet, puck, or disk with, for example, pressing.

Densification, such as by sintering, can occur in any suitable environment, including, for example, in inert gas (e.g., argon) or ambient air. The densification can occur at any suitable pressure, including, for example, about 10 MPa to about 200 MPa, such as between about 15 MPa to about 75 MPa, including any range there between. In one embodiment, the densification can occur at a pressure of at least about 80 MPa. The densification can occur at any suitable temperature, and, as noted above, can be simultaneous with heat-treating. In one embodiment, the densification is performed by sintering. In one embodiment, the sintering is a rapid induction hot pressing process. In one embodiment, the densification and/or heat treating can occur at a temperature of between about 700° C. and about 1200° C. or between about 700° C. and about 900° C., including any range there between. In another example, the densification can occur at a temperature of at least about 1000° C. In one embodiment, the densification is a rapid induction hot pressing process performed with a heating rate of between about 800 to about 1200° C./minute, or about 980 to 1020° C./minute, including any range therebetween, or at a rate of at least about 1000° C./minute, with a temperature of between about 700 and about 900° C., including any range therebetween and a pressure of between about 15 MPa and about 75 MPa, including any range therebetween.

In one embodiment, the calcined solid formation or the calcined particles are exposed to temperatures of greater than 650° C. and pressed at a pressure of greater than 10 MPa to produce an oxide ceramic solid having substantially no interconnected porosity (>90% theoretical density). In one embodiment, use of elevated temperatures allows for production of nano-sized solids.

In one embodiment complex ceramic solids can be synthesized according to the methods described herein, including, but not limited to, sodium cobalt oxide ($Na_xCoO_2$ wherein 0.5<x<1, NCO), calcium cobalt oxide ($Ca_3Co_4O_9$, CCO), rare earth doped calcium cobalt oxide (($Ca_{1-x}Yb_x)_3Co_4O_9$, ReCCO), lithium cobalt oxide ($LiCoO_2$, LCO}, lithium lanthanum zirconium oxide garnet ($Li_7La_3Zr_2O_{12}$, LLZO) lithium manganese nickel oxide ($Li_1Mn_{1.5}Ni_{0.5}O_4$, LMNO) and lithium titanium oxide ($Li_4Ti_5O_{12}$, LTO).

In one embodiment, this method is useful for bulk production of cubic LLZO. In one embodiment, the ceramic solid formed with the template-based process comprises a cubic garnet with the space group $Ia\bar{3}d$ or tetragonal garnet with the space group $I4_1/acd$. However, it is possible that tetragonal garnet may have less conductivity as compared with a cubic garnet. In one embodiment, the oxide ceramic solid contains lithium. The sites specific to lithium are 24d, 48g and 96h.

In one embodiment, the ceramic solid is an oxide ceramic solid. In one embodiment, the oxide ceramic solid is a cubic garnet having a formula of $A_xR_yC_zS_aO_{12}$ wherein "A" can be a cationic species such as, but not limited to, H, Li, Na, Mg, Al, Sc and/or Ga. The "A" cationic species can reside in an 8a, 16f, 32g, 24d, 48g or 96h site. "R" can be a cationic species such as, but not limited to, La, Ba and/or Ce. The "R" cationic species can reside in the 24c site. "C" can be a cation species such as, but not limited to, Zr, Ta, Nb, Y and/or Hf. The "C" cationic species can reside in the 16a site.

In one embodiment, the oxide ceramic solid is a cubic oxide ceramic solid, such as $Li_7La_3Zr_2O_{12}$. In one embodiment, the $Li_7La_3Zr_2O_{12}$ has an ionic conductivity of at least $3.6 \times 10^{-4}$ S/cm. In one embodiment, the $Li_7La_3Zr_2O_{12}$ is at least 90% dense or more, such as between about 90% and about 95% or about 90% and about 97.6% dense, including any range there between. In one embodiment, the $Li_7La_3Zr_2O_{12}$ is at least about 97.6% dense. In one embodiment, aluminum is used to help the oxide ceramic solid form in a cubic phase.

In some embodiments, aluminum may be added to the solutions and/or to the solid (gel and/or powder) in powder form during heating or pre-heating steps, or a combination thereof. For example, see "E. Rangasamy, J. Wolfenstine and J. Sakamoto, *The role of Al and Li concentration on the formation of cubic garnet solid electrolyte of nominal composition $Li_7La_3Zr_2O_{12}$*, Solid State Ionics, 206, 28-32 (2011).

The aluminum compound can include, for example, an aluminum oxide, aluminum salt, or organoaluminum compound. In one embodiment, the aluminum compound can include $Al_2O_3$, $Al(NO_3)_{3\text{-}9}H_2O$, $Al(OH)_3$, aluminum, aluminum acetylacetonate, aluminum triethoxide, aluminum butoxide, aluminum propoxide, aluminum methoxide, aluminum chloride, aluminum chloride hexahydrate, diethylaluminum chloride, aluminum oleate, aluminum acetate n-hydrate, aluminum oxalate, aluminum bromide, aluminum stearate, triethyl aluminum, trimethyl aluminum, triisobutyl aluminum, aluminum sulfate, aluminum iodide, and/or any aluminum salt of an organic or mineral acid. In one embodiment, the aluminum compound can include aluminum oxide ($Al_2O_3$).

In the embodiment shown in FIG. 1A, a template-based process 100 is provided comprising dissolving 102 ceramic precursor components in a solvent to produce a ceramic precursor solution; combining 104 the ceramic precursor solution with a hydrogel precursor to produce a solubilized hydrogel template; gelling 106 the solubilized hydrogel template to produce a wet gel comprising a hydrogel template containing an entrapped ceramic precursor solution.

In one embodiment, the process further comprises drying 108 the hydrogel template containing the entrapped ceramic precursor solution to produce a dried gel containing a ceramic precursor mixture; pre-heating 110 the dried gel to produce a pre-heated ceramic precursor mixture; milling 112 the pre-heated ceramic precursor mixture to produce a pre-heated powder containing the ceramic precursor mixture; solidifying 114 the pre-heated powder to produce a pre-heated solid formation containing the ceramic precursor mixture; calcining 116 the pre-heated solid formation containing the ceramic precursor mixture to produce a calcined ceramic solid formation; milling 118 the calcined ceramic solid formation to produce calcined ceramic powder; and densifying 120 the calcined ceramic powder to produce a densified ceramic solid In the embodiment shown in FIG. 1B, the drying step 108 of FIG. 1A is omitted and the step of gelling the solubilized hydrogel template to produce a wet gel comprising a hydrogel template containing an entrapped ceramic precursor solution 106 is followed immediately by pre-heating the wet gel to produce a pre-heated ceramic precursor mixture 111. Thereafter the process continues as described in FIG. 1A.

In one embodiment, a template, such as a hydrogel template, is formed in a separate container and then added to a container containing a separately produced precursor solution. Such a process may be referred to a two-step process, such as the process depicted in FIGS. 2A and 2B. Since no precursor components are initially present in the pores of the template in this embodiment, a concentration gradient is established between the template and the surrounding precursor solution. As the template soaks in the precursor solution, the solvent present in the pores of the template is exchanged for the precursor solution via diffusion.

The time period for solvent exchange can vary depending on the size of the template being used. In one embodiment, the time period is, at least about 5 to 30 min or 1 to 12 hours, such as up to 3 days. In a scaled-up process, it is likely that the time period can be reduced even further. Thereafter, the solvent-exchanged template (e.g., a hydrogel template now entrapping the precursor components) can be size-reduced in any suitable manner in order to expedite the drying process, such as by freeze-drying, cutting and the like. In various embodiments, the template or size-reduced template can be dried (e.g., air dried), and processed in the same manner as described for the hydrogel template in FIG. 1A.

Use of the two-step process to form the wet gel may be particularly useful in a variety of situations, including, but not limited to, when using ceramic precursor components which thermally decompose at temperature less then or near to the melting point of the hydrogel template; when the anion of a ceramic precursor salt interferes with formation of a hydrogel template; and/or when the hydrogel being used has a network forming mechanism which cannot successfully occur or occur to a desired degree in the presence of certain ceramic precursor components.

In the embodiment shown in FIG. 2, the method 200 comprises gelling 202 a hydrogel precursor to produce a hydrogel template; dissolving 204 ceramic precursor components in a solvent to produce a ceramic precursor solution; and combining 206 the ceramic precursor solution and the hydrogel template to produce a hydrogel template containing an entrapped ceramic precursor solution. The method 200 can further include the various steps described in FIG. 1A up to, for example, densifying 220 the calcined powder to produce a densified ceramic solid. In one embodiment, the hydrogel template is first dried prior to being immersed in the ceramic precursor solution. As such, in various embodiments, the hydrogel template can be wet or dry.

Methods of using ceramic solids are also provided herein, as well as devices and interfaces related thereto. As such, various embodiments provide batteries, fuel cells, and semi-fuel cells that include the oxide ceramic garnets, such as cubic phase LLZO having a nominal formula of $Li_7La_3Zr_2O_{12}$ (which can include a supervalent cation to stabilize the cubic phase) made by the methods described herein. Some embodiments provide methods of making batteries, fuel cells, and semi-fuel cells that include the method of making $Li_7La_3Zr_2O_{12}$ described herein. The cubic phase $Li_7La_3Zr_2O_{12}$ can be included in the electrolyte of the battery, fuel cell, or semi-fuel cell. The battery, fuel cell, or semi-fuel cell can be solid-state. See, for example, the discussion of FIGS. 3-5 and 7-10 in the '843 application, which is hereby incorporated by reference herein in its entirety.

In one embodiment, significant quantities of LLZO are used to integrate this material into Li-battery technology for vehicle electrification and grid storage (such as about 10 to about 100 kg per electric vehicle). In one embodiment, the resulting material is useful in superconductor production, such as a YBaCo-Oxide superconductor.

In one embodiment, a method of making an electrolyte interface is also provided. In one embodiment, the method comprises providing a slurry that includes an oxide ceramic compound having an atomic formula comprising: $A_xR_yC_z$-$S_aO_{12}$, wherein A is a first cationic species selected from H, Li, Na, Mg, Al and/or Ga and residing in an 8a, 16f, 32g, 24d, 48g or 96h site; R is a second cationic species selected from La, Ba and/or Ce and residing in a 24c site; and C is a third cationic species selected from Zr, Ta, Nb, Y or Hf and residing in the 16a site; and providing an oxide ceramic electrolyte that includes a compound selected from $A_xR_yC_z$ $S_aO_{12}$; forming at least one 3D feature on the oxide ceramic electrolyte, to provide an un-sintered electrolyte interface, wherein the 3D feature includes the slurry; and sintering the un-sintered electrolyte interface, to provide the electrolyte interface.

The forming step can comprise, for example, ink jet printing the slurry on the oxide ceramic electrolyte, self-assembled patterning, using a mold, stamping the 3D feature into the slurry or using a mold. The mold can comprise, for example, fibers bonded to the oxide ceramic electrolyte or a patterned sheet.

In one embodiment, the at least one 3D features on the oxide ceramic electrolyte are arranged in a pattern to form an electrolyte interface with hierarchical and highly ordered porosity.

The resulting LLZO materials possess very low electrical conductivity (less than $10^{-8}$ S/m at room temperature).

In contrast, resulting NCO and CCO materials possess considerable electrical conductivities and may be useful as a superconductor.

The various embodiments will be further described by reference to the following examples, which are offered to further illustrate various embodiments of the present invention. It should be understood, however, that many variations and modifications may be made while remaining within the scope of the various embodiments.

Example 1

Agarose Gel

An agarose template was solubilized in a solution containing no precursor components to produce a solubilized agarose template which was gelled to form an agarose gel. A 15 g basis was used for the agarose template which comprised 3 wt % agarose (0.75 g, Sigma-Aldrich #A0169) and 97 wt % Reverse Osmosis (RO) tap water available in the laboratory.

The agarose was measured into a 20 mL scintillation vial and dispersed with a mixer (VWR #12620-838) for 30 seconds. The vial was then placed into a microwave (1500W, Montgomery Ward #KSA-8089T) and heated repeatedly at 10% power for 15 seconds at a time and repeated about 5 to about 10 times (or more if needed) until the agarose became molten. The vial was then removed from the microwave and centrifuged with a centrifuge at 2500 RPM for 5 min (Thermo Electron Corporation #CENTRA-CL2 centrifuge). Thereafter, the vial was left on a benchtop at room temperature overnight i.e., about 10-16 hrs, to allow the contents to cool and form a gel.

After the sample was gelled, it was removed from the vial. The wet gel was supercritically dried using supercritical fluid extraction with $CO_2$.

Figure 3:
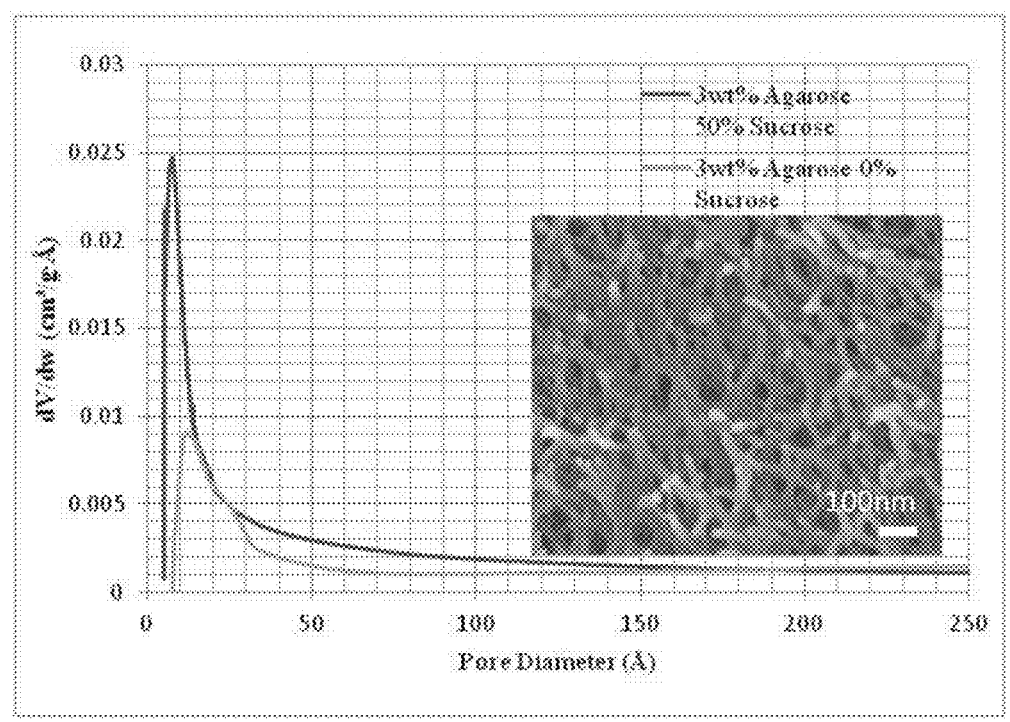
FIG. 3 shows the surface area and pore distribution of a dry hydrogel template and a Scanning Electron Microscope (SEM) image of the dry hydrogel template according to various embodiments.

Nitrogen adsorption (Micromeritics Model ASAP 2020) was performed on the dried gel to measure the surface area and pore distribution, with the results shown in FIG. 3. Since nitrogen adsorption measurements are not valid for pore sizes >150 nm, scanning electron microscopy (SEM) analysis was performed with a JEOL 7500F field emission SEM to check the validity and is shown in the insert of FIG. 3.

The surface area and pore distributions were used in selection of the hydrogel template. Additionally, the values were used as a baseline for comparison.

Example 2

Densified NCO Powder

Unless otherwise stated, all components and equipment (including equipment settings) are the same as noted in Example 1. The process shown in FIG. 1A was followed, with pre-calcining used for the pre-heating step 110 and an additional cutting step used to size-reduce the hydrogel (agarose) template produced in the gelling step 106.

A stoichiometry of $Na_1CoO_2$ was used for the sample. A 3 g basis for the salt precursors and a 15 g basis for the hydrogel were used. The hydrogel comprised 5 wt % agarose powder, 50 wt % sucrose powder (7.5 g sucrose crystal, Avantor performance materials #4072-05) and 45 wt % Reverse Osmosis (RO) water available in the laboratory.

The precursor components comprising sodium nitrate (0.6781 g, Spectrum Chemicals #S1345) and cobalt nitrate hexahydrate (2.3219 g, Sigma-Aldrich #239267) and the sucrose were measured out into a 20 mL scintillation vial and fully dissolved (i.e., solution was a substantially translucent red with no observable undissolved particulates) in water (6.7 mL, RO). The agarose was then added to the vial and dispersed with the mixer for approximately 30 seconds. The vial was then placed into the microwave at 10% power for repeated 15 second cycles and repeated about 5 to about 10 times (or more if needed) until the agarose was molten.

The vial was then removed from the microwave and centrifuged at 2500 RPM for approximately 5 min (Thermo Electron Corp. Centrifuge #CENTRA-CL2). After centrifuging, the vial was left at room temperature on a benchtop to cool overnight i.e., about 10-16 hrs, and gel, thus forming the agarose template containing the entrapped ceramic precursor solution.

The agarose template (containing the entrapped ceramic precursor solution) removed from the vial and cut into small pieces (about the size of peas) to expedite drying. The agarose template was dried in air for three days to form a dried gel (FIG. 4A) containing the ceramic precursor mixture.

Figure 4A:
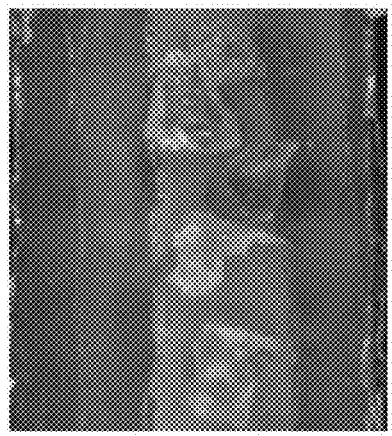
FIG. 4A is a photographic image of a dried gel containing an oxide ceramic precursor mixture according to an embodiment.
Figure 4B:
FIG. 4B is a photographic image of a pre-calcined solid formation containing an oxide ceramic precursor mixture according to an embodiment.

Thereafter, the dried gel was placed in a quartz tube and pre-calcined in a furnace (Thermo Scientific Lindberg Blue M tube furnace) at 450° C. for about 4 hrs to form a pre-calcined solid formation containing the oxide ceramic precursor mixture (FIG. 4B). The pre-calcined solid formation was collected, ground with a mortar and pestle, and cold pressed (387 MPa, Carver 25 metric ton laboratory press #3853 with a ½ inch stainless steel die) to form a solid formation containing the ceramic precursor mixture.

Figure 4C:
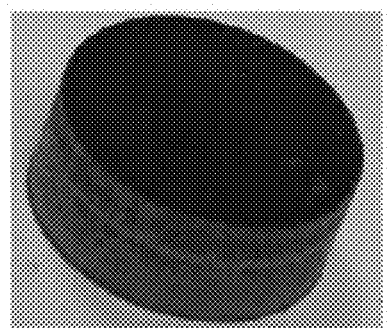
FIG. 4C is a photographic image of a calcined oxide ceramic solid formation according to an embodiment.
Figure 4D:
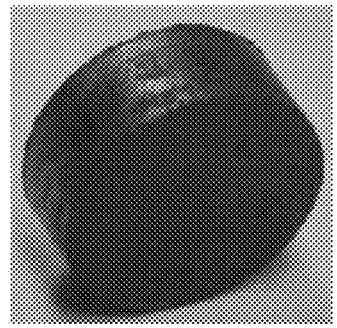
FIG. 4D is a photographic image of a densified oxide ceramic solid according to an embodiment.

The solid formation (containing the ceramic precursor mixture) was calcined in a Thermo Scientific Lindberg Blue M tube furnace at various temperatures such as at about 600° C., 700° C. and 800° C. for about 4 hrs in a zirconia-coated boat (Coors high alumina combustion boat Sigma-Aldrich #Z561754, zirconium oxide cement Alfa Aesar #42493) to form a calcined ceramic solid formation (FIG. 4C).

Figure 5A:
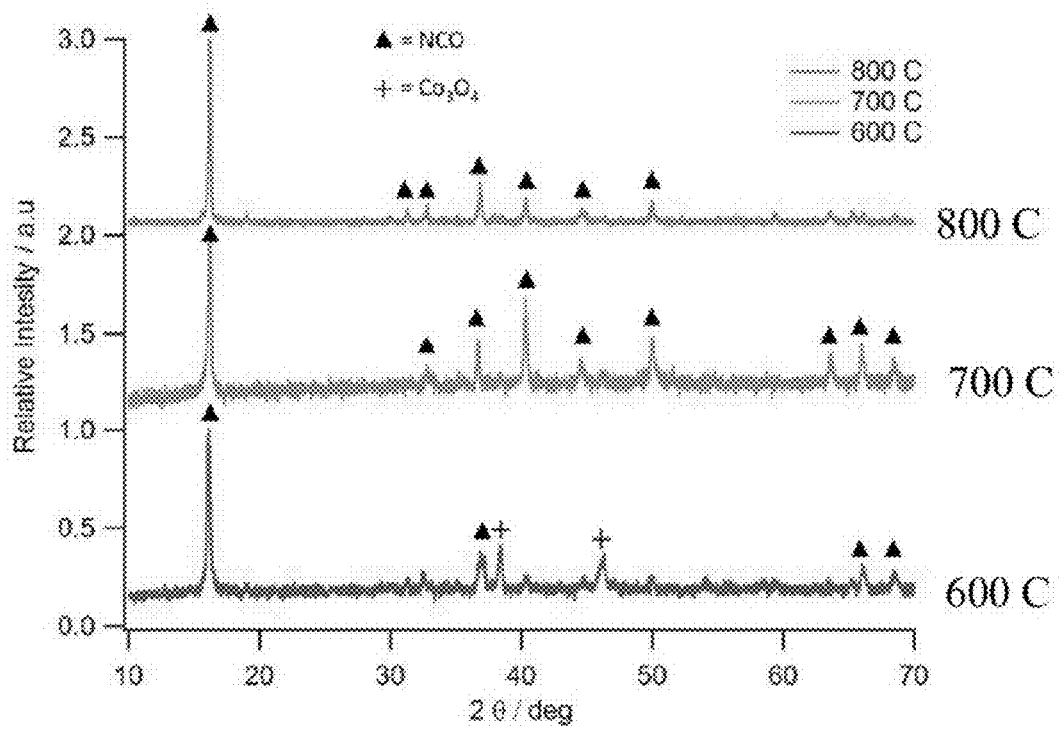
FIG. 5A is an x-ray diffraction plot (XRD) of sodium cobaltate, i.e., sodium cobalt oxide or "NCO" calcined at various temperatures according to various embodiments.
Figure 5B:
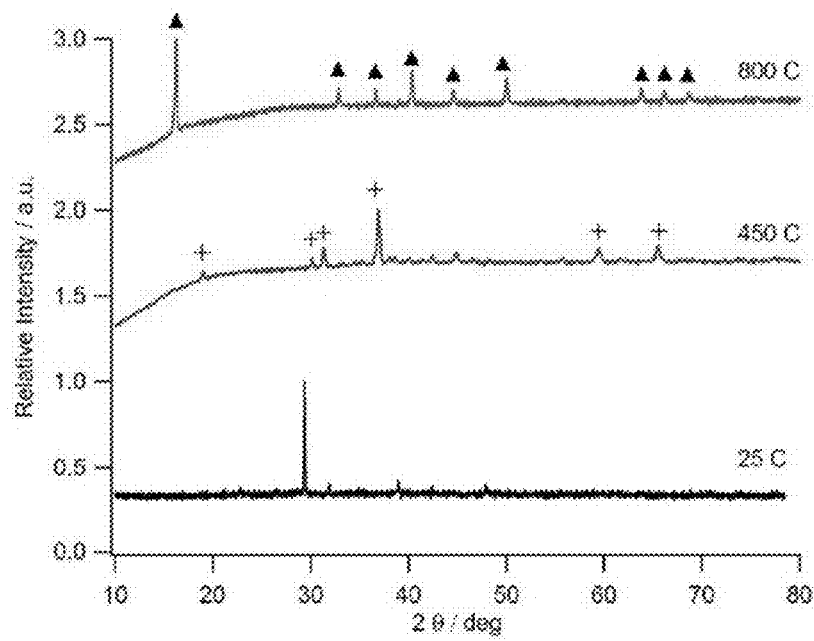
FIG. 5B is an XRD of NCO as dried (25° C.), pre-calcined (450° C.) and calcined (800° C.) according to various embodiments.

The calcined solid formation was ground with a mortar and pestle to produce a calcined ceramic powder. Powder XRD was performed to check phase purity and is shown in FIGS. 5A and 5B.

The x-ray diffraction (XRD) pattern at 25° C. of the dried gel differs significantly from that of the ceramic precursors, suggesting that the template is disrupting the formation of long range order as the precursors precipitate. The XRD pattern at 450° C. of the pre-heated ceramic precursor mixture showed only $Co_3O_4$, suggesting that the NCO phase formation had not yet begun. The XRD pattern at 600° C. of the calcined ceramic solid showed that NCO phase formation had begun, but that significant residual $Co_3O_4$ was still present. The XRD patterns at 700° C. and 800° C. show that the calcined ceramic solid was phase-pure NCO.

At this point, the calcined ceramic powders were densified by sintering with a rapid induction hot pressing process, described in A. LaLonde, et. al., "*Rapid Consolidation of Powdered Materials by Induction Hot Pressing*," Review of Scientific Instruments 82, pp. 025104-1 to 4 (2011), which is incorporated herein by reference in its entirety, although without using argon. For the NCO shown in FIG. 4D, the heating rate was about 1000° C./min, the sintering temperature was about 900° C. and the pressure was about 40 MPa.

Example 3

Calcined LCO Powder

Unless otherwise stated, all components and equipment (including equipment settings) are the same as noted in Example 1. The process described in FIG. 1A was followed, with pre-calcining used for the pre-heating step 110 and an additional cutting step used to size-reduce the hydrogel (agarose) template produced in the gelling step 106.

A stoichiometry of $Li_1CoO_2$ was used for the sample. A 3 g basis for the salt precursors and a 15 g basis for the hydrogel were used. The hydrogel comprised 5 wt % agarose and 95 wt % RO water.

The precursor components comprising lithium acetate dihydrate (0.8717 g, Alfa Aesar #13417) and cobalt acetate tetrahydrate (2.1283 g, Sigma-Aldrich #403024) were measured out into a 20 mL scintillation vial and fully dissolved in water (14.25 mL, RO). The agarose (0.75 g, Sigma-Aldrich #A0169) was then added to the vial and dispersed with mixing for approximately 30 seconds. The vial was then placed into the microwave at 10% power for repeated 15 second cycles and repeated about 5 to about 10 times (or more if needed) until the agarose was molten.

The vial was then removed from the microwave and centrifuged (2500 RPM for approximately 5 min). After centrifuging, the vial was left at room temperature to cool overnight i.e., about 10-16 hrs, and gel, thus forming the agarose template containing the entrapped ceramic precursor solution.

The agarose template (containing the entrapped ceramic precursor solution) removed from the vial and cut into small pieces to expedite drying. The agarose template was dried in air for three days to form a dried gel containing the ceramic precursor mixture.

Thereafter, the dried gel was placed in a quartz tube and pre-calcined in the tube furnace at 450° C. for about 4 hrs to form a pre-calcined solid formation containing the oxide ceramic precursor mixture. The pre-calcined ceramic solid formation was collected, ground with a mortar and pestle, and cold pressed to form a solid formation containing the ceramic precursor mixture.

The solid formation (containing the ceramic precursor mixture) was calcined in the tube furnace at 800° C. for about 4 hrs in a zirconia-coated boat to form a calcined ceramic solid formation.

Figure 6A:
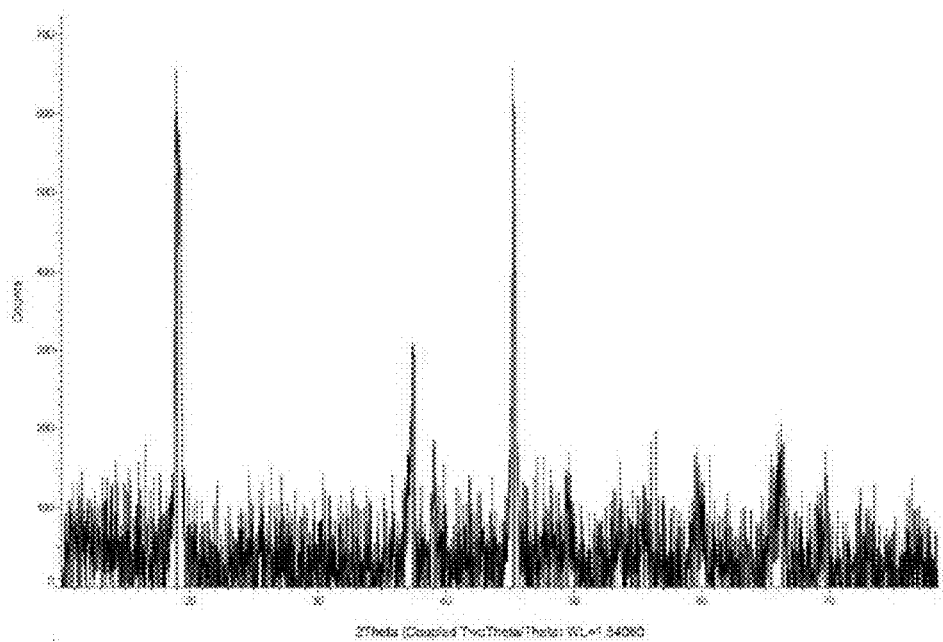
FIG. 6A is an XRD of lithium cobaltate, i.e., lithium cobalt oxide or "LCO" after pre-calcining at 450° C. according to an embodiment.
Figure 6B:
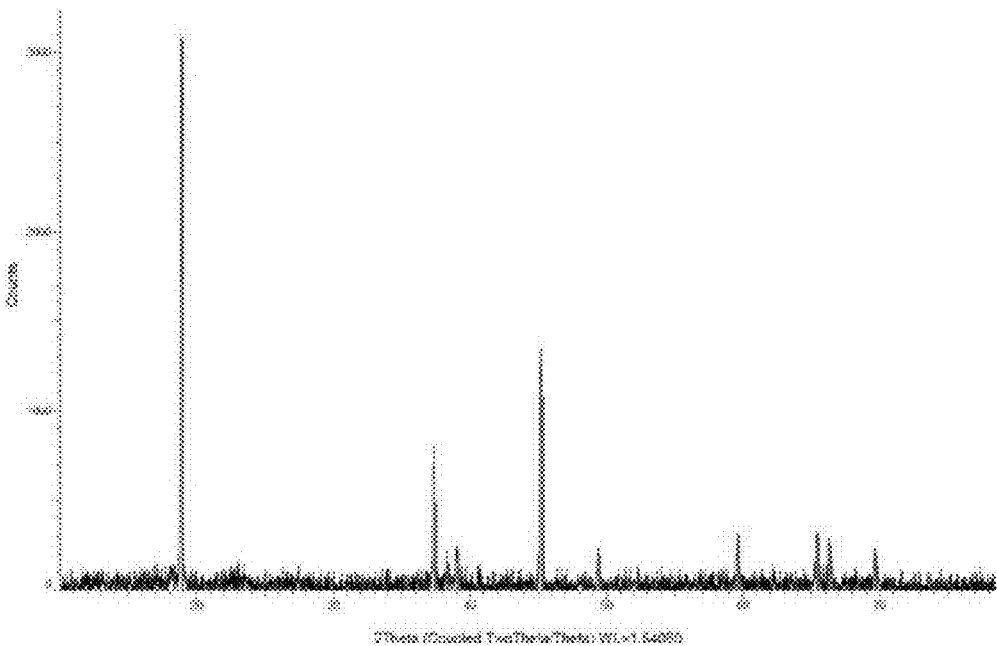
FIG. 6B is an XRD of LCO after calcination at 800° C. according to an embodiment.

The calcined solid formation was ground with a mortar and pestle to produce calcined ceramic powder. Powder XRD was performed to check phase purity and is shown in FIGS. 6A and 6B.

The XRD pattern of the pre-calcined ceramic precursor mixture showed that LCO formation had begun but had yet to become highly crystalline. The XRD pattern of the calcined ceramic at 800° C. shows highly crystalline, phase-pure LCO.

Example 4

Pre-Calcined LMNO Powder

Unless otherwise stated, all components and equipment (including equipment settings) are the same as noted in Example 1. The process followed is as is described in FIG. 1A, with pre-calcining used for the pre-heating step 110 and an additional cutting step used to size-reduce the hydrogel (agarose) template produced in the gelling step 106.

A stoichiometry of $Li_1Mn_{1.5}Ni_{0.5}O_4$ was used for the sample. A 3 g basis for the salt precursors and a 15 g basis for the hydrogel were used. The hydrogel was 5 wt % agarose and 95 wt % RO water.

The precursor components comprising lithium acetate dihydrate (0.8717 g, Alfa Aesar #13417), manganese acetate tetrahydrate (1.0380 g, Sigma-Aldrich #221007), and nickel acetate tetrahydrate (1.0781 g, Sigma-Aldrich #244066) were measured out into a 20 mL scintillation vial and fully dissolved in water (14.25 mL, RO). The agarose (0.75 g, Sigma-Aldrich #A0169) was then added to the vial and dispersed with mixing for approximately 30 seconds. The vial was then placed into the microwave at 10% power for repeated 15 second cycles and repeated about 5 to about 10 times (or more if needed) until the agarose was molten.

The vial was then removed from the microwave and centrifuged at 2500 RPM for approximately 5 min. After centrifuging, the vial was left at room temperature to cool overnight i.e., about 10-16 hrs, and gel, thus forming the agarose template containing the entrapped ceramic precursor solution.

The agarose template (containing the entrapped ceramic precursor solution) was removed from the vial and cut into small pieces to expedite drying. The agarose template was dried in air for three days to form a dried gel containing the ceramic precursor mixture.

Thereafter, the dried gel was placed in a quartz tube and pre-calcined in the tube furnace at 450° C. for about 4 hrs to form a pre-calcined solid formation containing the oxide ceramic precursor mixture. The pre-calcined ceramic formation was collected, ground with a mortar and pestle, and cold pressed to form a solid formation containing the ceramic precursor mixture.

Figure 7:
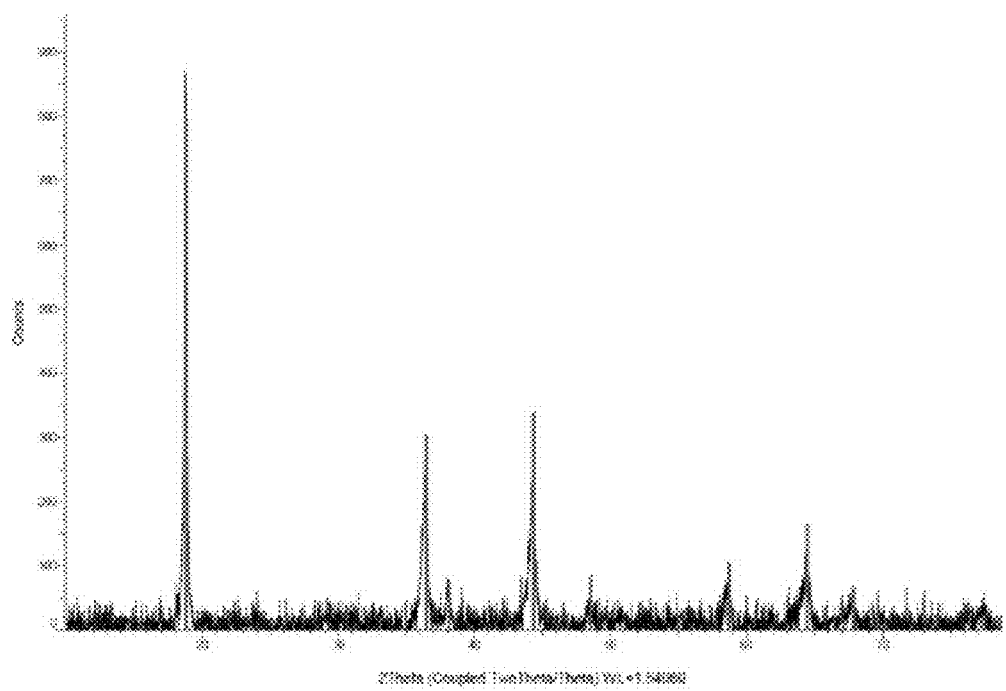
FIG. 7 is an XRD of lithium manganese nickel oxide (LMNO) after pre-calcining at 450° C. according to an embodiment.

Powder XRD was performed on the pre-calcined ceramic precursor mixture to check phase purity and is shown in FIG. 7.

Since the sample was already phase pure LMNO, no calcination was performed. A phase formation temperature of 450° C. is unusually low for an oxide ceramic.

Example 5

Densified Calcium Cobalt Oxide (CCO) and CCO with Rare Earth Doping (ReCCO) Powder Unless otherwise stated, all components and equipment (including equipment settings) are the same as noted in Example 1. The process followed is as is described in FIG. 1A, with pre-calcining used for the pre-heating step 110 and an additional cutting step used to size-reduce the hydrogel (agarose) template produced in the gelling step 106.

CCO

A stoichiometry of $Ca_3Co_4O_9$ was used for the sample. A 3 g basis for the salt precursors and a 15 g basis for the hydrogel were used. The hydrogel was 5 wt % agarose and 95 wt % RO water.

The precursor components comprising calcium acetate hydrate (1.0399 g, Sigma-Aldrich #402850) and cobalt acetate tetrahydrate (1.9601 g, Sigma-Aldrich #403024) were measured out into a 20 mL scintillation vial and fully dissolved in water (14.25 mL, RO).

ReCCO

The same procedure for CCO was followed except that different precursor components were used. Specifically, the Ca precursor salt was substituted for a Yb salt. A stoichiometry of $(Ca_{1-x}Yb_x)_3Co_4O_9$ was used for the sample. A 3 g basis for the precursor components and a 15 g basis for the hydrogel were used. The hydrogel was 5 wt % agarose and 95 wt % RO water.

Figure 8A:
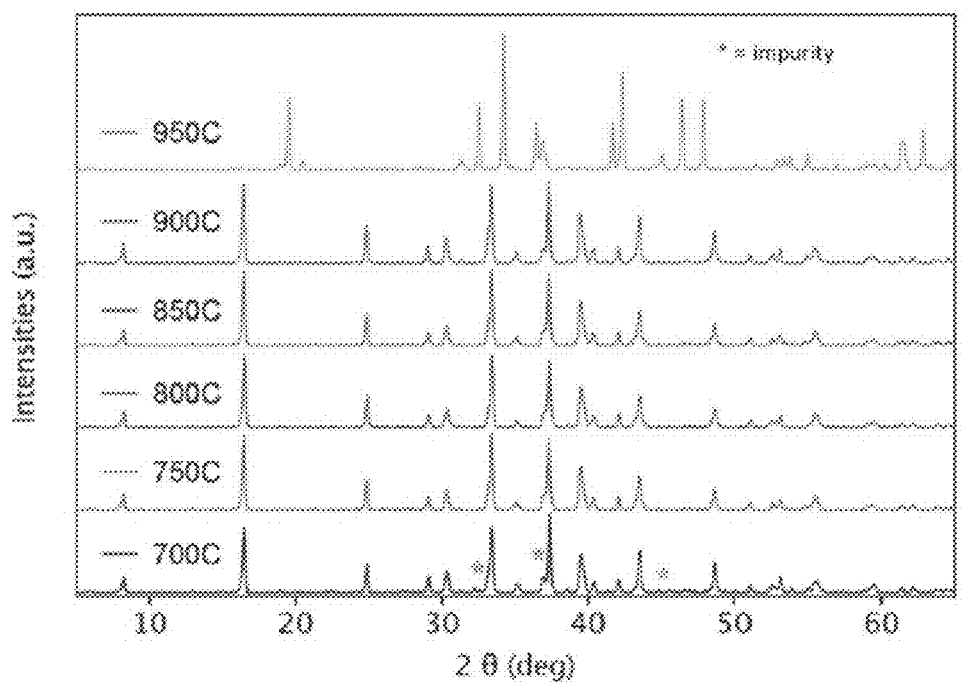
FIG. 8A is an XRD of calcium cobaltate, i.e., calcium cobalt oxide or "CCO" calcined at various temperatures according to various embodiments.
Figure 8B:
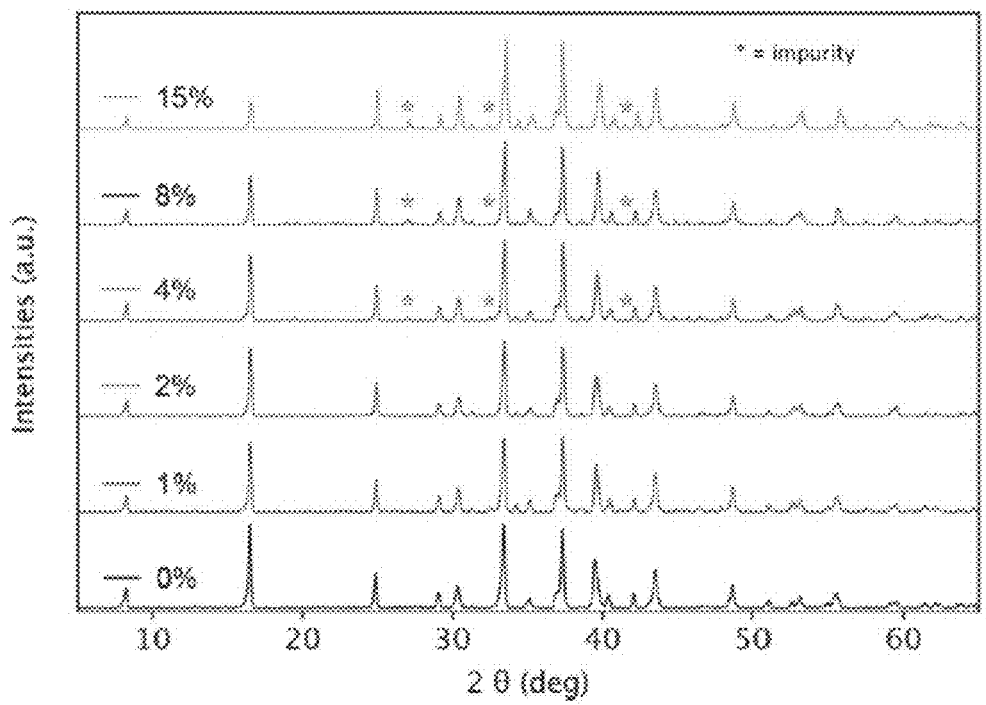
FIG. 8B is an XRD of CCO with rare earth doping (ReCCO) doped with Yb as a function of dopant amount according to various embodiments.

The Yb precursor was ytterbium acetate tetrahydrate at various concentrations ("x") as shown in FIGS. 8A and 8B. For example, for x=2%, calcium acetate monohydrate (1.0093 g, Sigma-Aldrich #402850), cobalt acetate tetrahydrate (1.9413 g, Sigma-Aldrich #403024) and ytterbium acetate tetrahydrate (0.0494 g, Sigma-Aldrich #326011) were measured out into a 20 mL scintillation vial and fully dissolved in water (14.25 mL, RO).

For each of the above samples, agarose (0.75 g, Sigma-Aldrich #A0169) was then added to the vial and dispersed with mixing for approximately 30 seconds. The vial was then placed into the microwave at 10% power for repeated 15 second cycles and repeated about 5 to about 10 times (or more if needed) until the agarose was molten.

The vial was then removed from the microwave and centrifuged at 2500 RPM for approximately 5 min. After centrifuging, the vial was left at room temperature to cool overnight i.e., about 10-16 hrs, and gel, thus forming the agarose template containing the entrapped ceramic precursor solution.

The agarose template (containing the entrapped ceramic precursor solution) was removed from the vial and cut into small pieces to expedite drying. The agarose template was dried in air for three days to form a dried gel containing the ceramic precursor mixture.

Thereafter, the dried gel was placed in a quartz tube and pre-calcined in the tube furnace at 450° C. for about 4 hrs to form a pre-calcined solid formation containing the oxide ceramic precursor mixture. The pre-calcined ceramic formation was collected, ground with a mortar and pestle, and cold pressed to form a solid formation containing the ceramic precursor mixture.

The solid formation (containing the ceramic precursor mixture) was calcined in the tube furnace at various temperatures for 4 hrs in a zirconia-coated boat to form a calcined ceramic solid formation.

The calcined solid formation was ground with a mortar and pestle to produce calcined ceramic powder. Powder XRD was performed to check phase purity and is shown in FIG. 8A (CCO) and FIG. 8B (ReCCO).

The XRD shown in FIG. 8A showed that the CCO was phase pure when calcined at greater than 750° C. but less than 950° C. The XRD shown in FIG. 8B showed that the CCO could be doped with the rare earth Yb up to 4% before an impurity phase was observed.

At this point, the calcined ceramic powders were sintered according to the method described in Example 2, with a sintering temperature of about 850° C. and pressure of about 40 MPa, to produce a densified ceramic solid.

Example 6

Calcined LTO Powder

Unless otherwise stated, all components and equipment (including equipment settings) are the same as noted in Example 1. The process followed is as is described in FIG. 1A, with pre-calcining used for the pre-heating step 110 and an additional cutting step used to size-reduce the hydrogel (agarose) template produced in the gelling step 106.

A stoichiometry of $Li_4Ti_5O_{12}$ was used for the sample. A 3 g basis for the salt precursors and a 15 g basis for the hydrogel were used. The hydrogel comprised 5 wt % agarose and 95 wt % RO water.

The precursor components comprising lithium acetate dihydrate (0.8717 g, Alfa Aesar #13417) was measured out into a 20 mL scintillation vial and fully dissolved in water (14.25 mL, RO). Titanium (IV) oxide nanopowder (1.4838 g, anatase 32 nm, Alfa Aesar #39953) was then measured out into the vial and dispersed with ultrasonication (30 sec, Sonics and Materials Inc. #VCX600).

The agarose (0.75 g, Sigma-Aldrich #A0169) was then added to the vial and dispersed with mixing for approximately 30 seconds. The vial was then placed into the microwave at 10% power for repeated 15 second cycles and repeated about 5 to about 10 times (or more if needed) until the agarose was molten.

The vial was then removed from the microwave and centrifuged at 2500 RPM for approximately 5 min. After centrifuging, the vial was left at room temperature to cool overnight, about 10-16 hrs, and gel, thus forming the agarose template containing the entrapped ceramic precursor solution.

The agarose template (containing the entrapped ceramic precursor solution) was removed from the vial and cut into small pieces to expedite drying. The agarose template was dried in air for three days to form a dried gel containing the ceramic precursor mixture.

Thereafter, the dried gel was placed in a quartz tube and pre-calcined in the tube furnace at 450° C. for about 4 hrs to form a pre-calcined solid formation containing the oxide ceramic precursor mixture. The pre-calcined ceramic formation was collected, ground with a mortar and pestle, and cold pressed to form a solid formation containing the ceramic precursor mixture.

The solid formation (containing the ceramic precursor mixture) was calcined in the tube furnace at 800° C. for about 4 hrs in a zirconia-coated boat to form a calcined ceramic solid formation.

Figure 9:
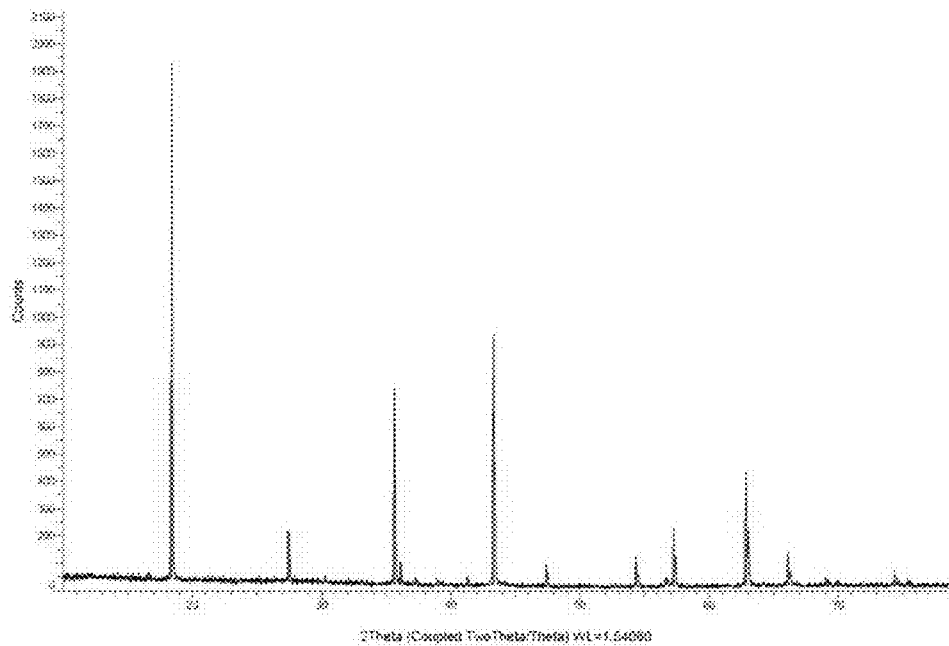
FIG. 9 is an XRD of lithium titanate, i.e., lithium titanium oxide or "LTO" after calcination at 800° C. according to an embodiment.

The calcined solid formation was ground with a mortar and pestle to produce calcined ceramic powder. Powder XRD was performed to check phase purity and is shown in FIG. 9 (LTO).

It could be seen in the XRD of the calcined ceramic powder that the LTO phase had begun to form but that residual $TiO_2$ precursor was still present. It is likely that the residual $TiO_2$ precursor could be eliminated with further optimization of the calcination process for LTO.

Example 7

Two-Step NCO Powder

Unless otherwise stated, all components and equipment (including equipment settings) are the same as noted in Example 1. The process shown in FIG. 2A was followed.

A stoichiometry of $Na_1CoO_2$ was used for the sample. A 3 g basis for the salt precursors and a 15 g basis for the hydrogel were used. The hydrogel comprised 5 wt % agarose powder 50 wt % sucrose powder and 45 wt % RO water. Sucrose (7.5 g sucrose crystal, Avantor performance materials #4072-05) were measured out into a 20 mL scintillation vial and fully dissolved in the water (6.75 mL, RO).

The agarose (0.75 g, Sigma-Aldrich #A0169) was then added to the vial and dispersed with mixing. The vial was then placed into the microwave at 10% power for repeated 15 second cycles and repeated about 5 to about 10 times (or more if needed) until the agarose was molten. The vial was removed from the microwave and centrifuged at 2500 RPM for approximately 5 min. After centrifuging, the vial was left at room temperature overnight, i.e., about 10-16 hrs, to finish cooling and gel, thus forming the agarose template.

While the agarose template was cooling, sodium nitrate (0.6781 g, Spectrum Chemicals #S1345), cobalt nitrate hexahydrate (2.3219 g, Sigma-Aldrich #239267) were measured out into a 20 mL scintillation vial and fully dissolved in water (6.75 mL, RO) to form a precursor solution.

Figure 10A:
FIG. 10A is an image of a hydrogel template according to an embodiment.
Figure 10B:
FIG. 10B is an image of a hydrogel template containing an entrapped oxide ceramic precursor solution according to an embodiment.

The agarose template was then placed into the precursor solution and allowed to soak for three days, with the precursor solution exchanged for fresh precursor solution once a day (FIG. 10A).

After the third day, the agarose template now containing an entrapped precursor solution (FIG. 10B) was removed from the precursor solution.

Example 8

Densified Aluminum Doped LLZO Powder from Agarose Hydrogel Template

Unless otherwise stated, all components and equipment (including equipment settings) are the same as noted in Example 1. The process shown in FIG. 1A was followed, with pre-calcining used for the pre-heating step 110 and an additional cutting step used to size-reduce the hydrogel (agarose) template produced in the gelling step 106.

A stoichiometry of $Li_{6.71}Al_{0.3}La_2Zr_2O_{12}$, a 3 g basis for the salt precursors, and a 15 g basis for the hydrogel were used. The hydrogel comprised 5 wt % agarose powder and 95 wt % RO water.

The precursor components comprising lithium acetate dihydrate (0.6345 g, Alfa Aesar #13417), aluminum nitrate nonahydrate (0.1043 g, Sigma-Aldrich #237973), lanthanum nitrate hexahydrate (1.2042 g, Sigma-Aldrich #61520), and zirconium acetate solution (0.8264 mL, Sigma-Aldrich #413801) were measured out into a 20 mL scintillation vial and fully dissolved (i.e., solution was a substantially translucent with no observable undissolved particulates) in water (14.25 mL, RO).

The agarose was then added to the vial and dispersed with the mixer for approximately 30 seconds. The vial was then placed into the microwave at 10% power for repeated 15 second cycles and repeated about 5 to about 10 times (or more if needed) until the agarose was molten.

The vial was then removed from the microwave and centrifuged at 2500 RPM for approximately 5 min (Thermo Electron Corp. Centrifuge #CENTRA-CL2). After centrifuging, the vial was left at room temperature on a benchtop to cool overnight, i.e., about 10-16 hrs, and gel, thus forming the agarose template containing the entrapped ceramic precursor solution.

The agarose template (containing the entrapped ceramic precursor solution) removed from the vial and cut into small pieces (about the size of peas) to expedite drying. The agarose template was dried in air for three days to form a dried gel containing the ceramic precursor mixture.

Thereafter, the dried gel was placed in a quartz tube and pre-heated in the tube furnace at 450° C. for 4 hrs to form a pre-calcined solid formation containing the oxide ceramic precursor mixture. The pre-calcined ceramic solid formation was collected, ground with a mortar and pestle, and cold pressed to form a solid formation containing the ceramic precursor mixture.

The solid formation (containing the ceramic precursor mixture) was calcined in the tube furnace at 1000° C. for about 4 hrs in a zirconia-coated boat to form a calcined ceramic solid formation.

Figure 11:
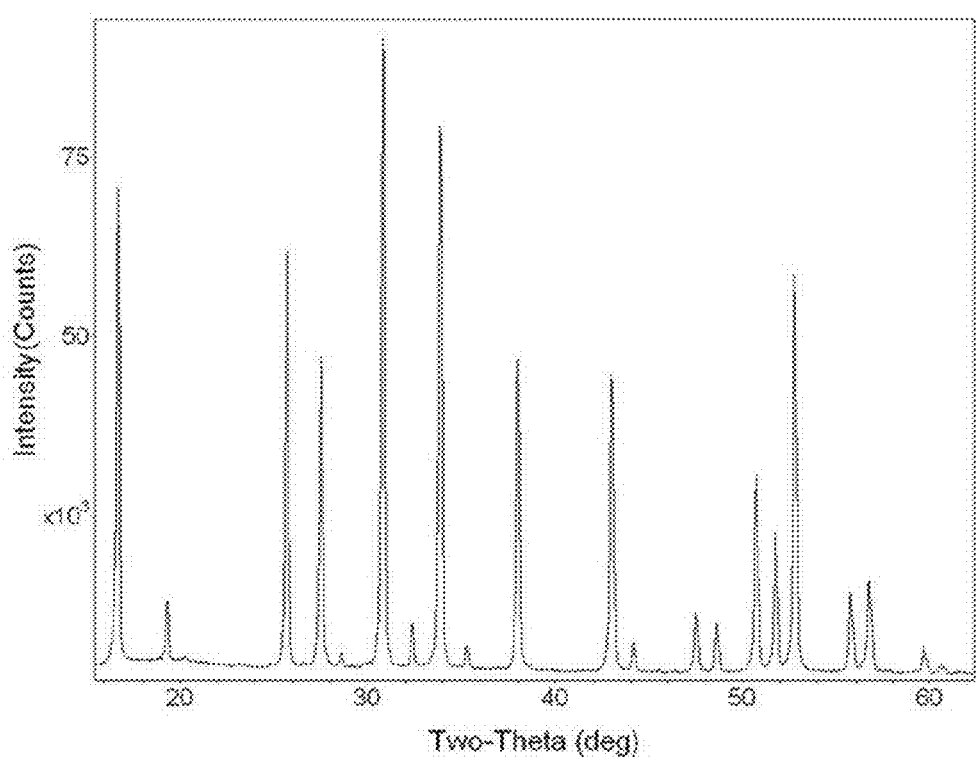
FIG. 11 is an XRD of lithium lanthanum zirconate, i.e., lanthanum zirconium oxide or "LLZO" garnet after calcination at 1000° C. according to an embodiment.

The calcined solid formation was ground with a mortar and pestle to produce calcined ceramic powder. Powder XRD was performed to check phase purity and is shown in FIG. 11. The XRD pattern shows highly crystalline, phase pure LLZO.

At this point, the calcined ceramic powders were densified as described in Example 2. For the LLZO, the heating rate was about 1000° C./min, the sintering temperature was about 1050° C. and the pressure was about 40 MPa.

Example 9

Densified Aluminum Doped LLZO Powder from PEG Hydrogel Template

The process shown in FIG. 1A was followed to produce a sample with a stoichiometry of $Li_{6.71}Al_{0.3}La_2Zr_2O_{12}$.

A 3 g basis for the salt precursors and a 15 g basis for the hydrogel were used. This basis was scaled to a volume of 360 mL.

The hydrogel comprised 10 wt % poly(ethylene glycol) dimethacrylate (31.6839 g, Polysciences #15178), 0.75 wt % photoinitiator (2.3767 g of 2-hydroxy-4'-(2-hydroxyethoxy)-2-methylpopiophenone, Sigma-Aldrich #410896) and 89.25 wt % (283 mL) Reverse Osmosis (RO) water.

The precursor components were comprised of lithium acetate dihydrate (13.4022 g, Alfa Aesar #13417), aluminum nitrate nonahydrate (2.2035 g, Sigma-Aldrich #237973), lanthanum nitrate hexahydrate (25.4350 g, Sigma-Aldrich #61520), and zirconium acetate solution (22.3270 mL, Sigma-Aldrich #413801). A 400 mL quartz tube was sealed on one end with a rubber stopper and the RO water was added. Thereafter, the precursor components were added to the tube and allowed to dissolve until a clear solution was obtained. Finally, the hydrogel precursor and the photoinitiator were added and allowed to dissolve until a clear solution was obtained.

The quartz tube was sealed on the open end with a rubber stopper containing "feed-throughs" to allow the inert gas to be flowed over the top of the solution. After 10 minutes of inert gas flow, the solutions contained in the quartz tube were exposed to UV light for approximately 15 min. After approximately 15 minutes, the PEG hydrogel had undergone gelation and was removed from the quartz tube. The wet PEG hydrogel (containing the entrapped ceramic precursor solution) was cut into small pieces (about the size of peas) to expedite drying. The PEG template was dried in air for three days to form a dried gel containing the ceramic precursor mixture.

Thereafter, the dried gel was placed in a quartz tube and pre-heated in the tube furnace in a quartz tube at 450° C. for about 4 hrs to form a pre-calcined solid formation containing the oxide ceramic precursor mixture. The pre-calcined solid formation was collected, ground with a mortar and pestle, and cold pressed (387 MPa, Carver 25 metric ton laboratory press #3853 with a ½-inch stainless steel die) to form a solid formation containing the ceramic precursor mixture.

The solid formation (containing the ceramic precursor mixture) was calcined in the tube furnace at 1000° C. for about 4 hrs in a zirconia-coated boat (Coors high alumina combustion boat Sigma-Aldrich #Z561754, zirconium oxide cement Alfa Aesar #42493) to form a calcined ceramic solid formation.

Figure 12:
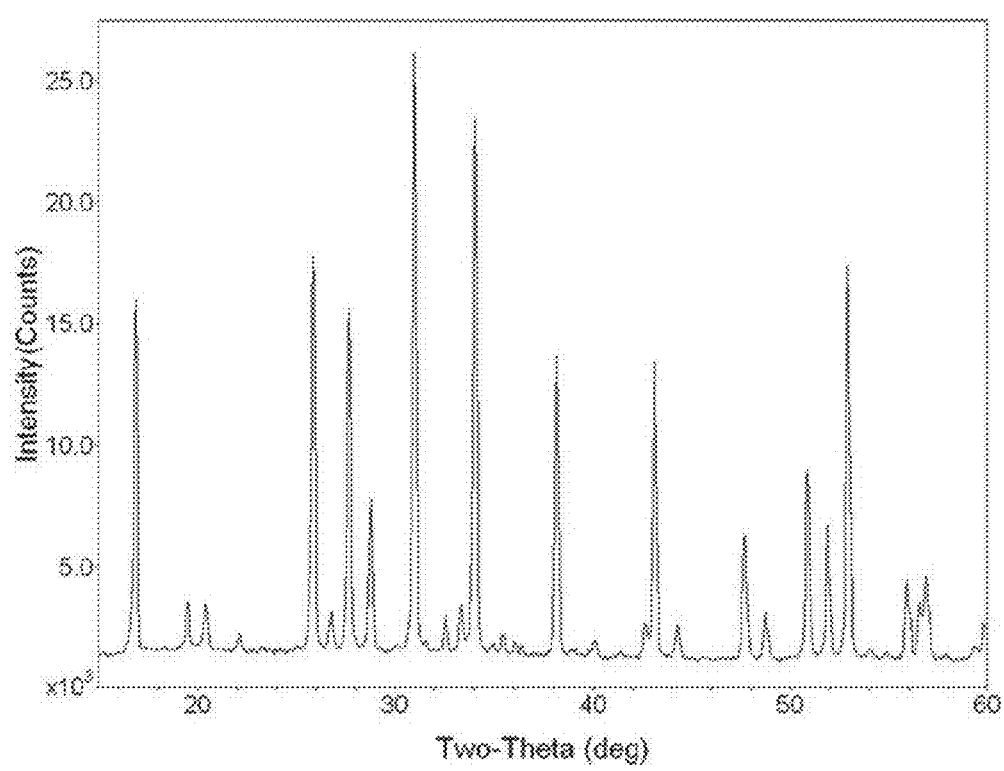
FIG. 12 is an XRD of LLZO using poly(ethylene glycol) after calcination at 1000° C. according to an embodiment.

The calcined solid formation was ground with a mortar and pestle to produce calcined ceramic powder. Powder XRD was performed to check phase purity and is shown in FIG. 12. The XRD pattern showed primarily cubic LLZO with trace impurities. It is expected that the impurities can be eliminated with further optimization to the calcination process.

At this point, the calcined ceramic powders were densified as described in Example 2. For the LLZO, the heating rate was about 1000° C./min, the sintering temperature was about 1050° C. and the pressure was about 40 MPa.

Example 10

Aluminum Doped LLZO Powder from PEG Hydrogel Template without Drying

Unless otherwise stated, all components and equipment (including equipment settings) are the same as noted in Example 9. The process shown in FIG. 1B was followed, except no drying step 108 was used.

The hydrogel comprised 10 wt % poly(ethylene glycol) dimethacrylate (31.6839 g, Polysciences #15178), 0.75 wt % photoinitiator (2.3767 g of 2-hydroxy-4'-(2-hydroxyethoxy)-2-methylpopiophenone, Sigma-Aldrich #410896) and 89.25 wt % (283 mL). Reverse Osmosis (RO) water was available in the laboratory. The precursor components were comprised of lithium acetate dihydrate (13.4022 g, Alfa Aesar #13417), aluminum nitrate nonahydrate (2.2035 g, Sigma-Aldrich #237973), lanthanum nitrate hexahydrate (25.4350 g, Sigma-Aldrich #61520), and zirconium acetate solution (22.3270 mL, Sigma-Aldrich #413801).

A 400 mL quartz tube was sealed on one end with a rubber stopper and the RO water was added. Thereafter, the precursor components were added to the tube and allowed to dissolve until a clear solution was obtained. Finally, the hydrogel precursor and the photoinitiator were added and allowed to dissolve until a clear solution was obtained.

The quartz tube was sealed on the open end with a rubber stopper containing "feed-throughs" to allow the inert gas to be flowed over the top of the solution. After approximately 10 minutes of inert gas flow, the solutions contained in the quartz tube were exposed to UV light for approximately 15 min. After approximately 15 minutes, the PEG hydrogel had undergone gelation and was removed from the quartz tube.

Thereafter, the wet gel, with no drying, was pre-heated in a furnace (Thermo Scientific Lindberg Blue M tube furnace) in a quartz tube at 450° C. for about 4 hrs to form a pre-calcined solid formation containing the oxide ceramic precursor mixture. The pre-calcined solid formation was collected, ground with a mortar and pestle, and cold pressed (387 MPa, Carver 25 metric ton laboratory press #3853 with a ½-inch stainless steel die) to form a solid formation containing the ceramic precursor mixture.

The solid formation (containing the ceramic precursor mixture) was calcined in a Thermo Scientific Lindberg Blue M tube furnace at 1000° C. for about 4 hrs in a zirconia-coated boat (Coors high alumina combustion boat Sigma-Aldrich #Z561754, zirconium oxide cement Alfa Aesar #42493) to form a calcined ceramic solid formation.

Figure 13:
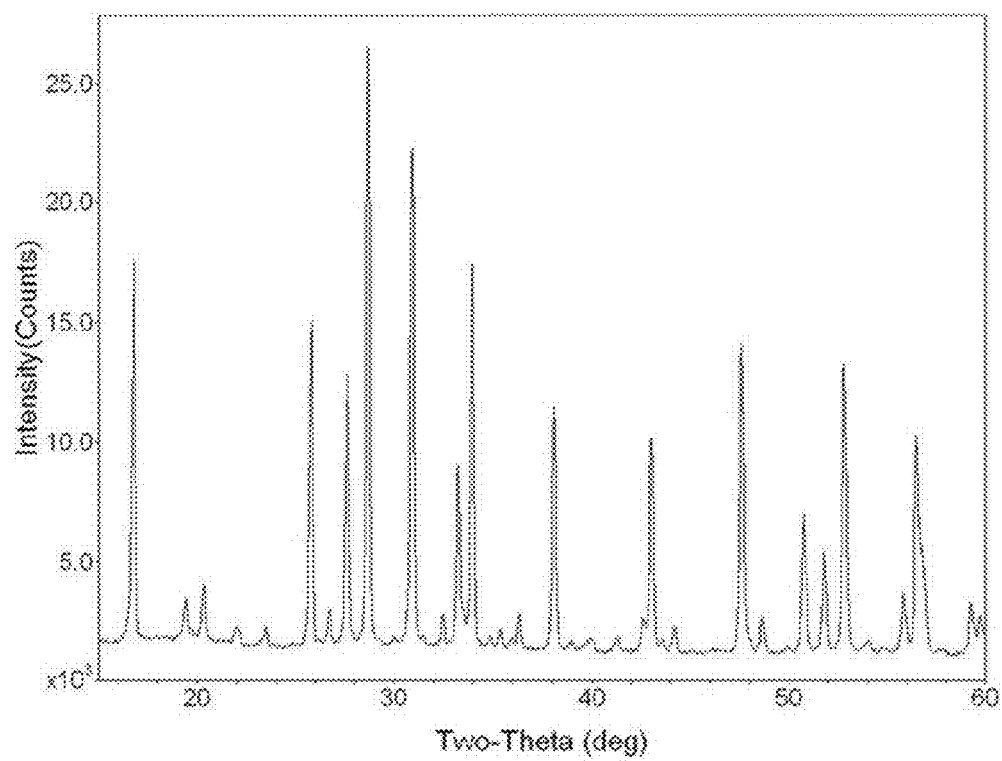
FIG. 13 is an XRD of LLZO using poly(ethylene glycol), without a drying step, after calcination at 1000° C. according to an embodiment.

The calcined solid formation was ground with a mortar and pestle to produce calcined ceramic powder. Powder XRD was performed to check phase purity and is shown in FIG. 13. The XRD pattern showed primarily cubic LLZO with trace impurities similar to those in FIG. 12. It is expected that the impurities can be eliminated with further optimization to the calcination process.

Example 11

Prophetic

The product produced according to the method described in Example 7 and described in FIG. 2A will be subjected to further processing, such as the processing described in examples 2-6.

Example 12

Prophetic

The process described in FIG. 2A will be followed, but with an added step of drying the resulting template prior to immersion in a ceramic precursor solution. It is expected that at least similar results may be obtained in terms of phase purity. It is possible that elimination of the solvent exchange step may expedite the process.

The various embodiments provide for methods of making and using ceramic solids, and products and devices not previously attainable in the art. In one embodiment, a method is provided comprising forming a template (e.g., hydrogel template) from a template precursor (e.g., hydrogel precursor), wherein the template contains an entrapped ceramic precursor solution.

The method can further comprise forming the template by either dissolving ceramic precursor components in a solvent to produce the ceramic precursor solution; combining the ceramic precursor solution with the hydrogel precursor to produce a solubilized hydrogel template; and gelling the solubilized hydrogel template to produce a wet gel comprising a hydrogel template containing an entrapped ceramic precursor solution.

The method can further comprise gelling the hydrogel precursor to produce the hydrogel template; dissolving ceramic precursor components in a solvent to produce the ceramic precursor solution; and combining the ceramic precursor solution with the hydrogel template (as is, dried or partially dried) to produce a wet gel comprising a hydrogel template containing the entrapped ceramic precursor solution. The method may further, optionally, comprise at least partially drying the hydrogel template prior to the combining step.

For either of the above methods, the follow steps are applicable:

In one embodiment, the method further comprises providing a molecule to the ceramic precursor solution capable of providing steric hindrance to the hydrogel template.

In one embodiment, the solvent can be a polar solvent (e.g., water), such as an organic polar solvent, and/or the ceramic precursor components can be metal salts.

The various embodiments can further comprise any one or more of the following steps which include: pre-heating the dried gel to produce a pre-heated ceramic precursor mixture; milling the pre-heated ceramic precursor mixture to produce a pre-heated powder containing the ceramic precursor mixture; and solidifying the pre-heated powder to produce a pre-heated solid formation containing the ceramic precursor mixture.

The embodiments can additionally or alternatively comprise calcining the pre-heated solid formation containing the ceramic precursor mixture to produce a calcined ceramic solid formation; optionally milling the calcined ceramic solid formation to produce calcined ceramic powder; and densifying the calcined ceramic powder to produce a densified ceramic solid (e.g., oxide ceramic solid, such as sodium cobalt oxide, lithium cobalt oxide, lithium manganese nickel oxide, calcium cobalt oxide, calcium cobalt oxide with rare earth doping, lithium titanium oxide, or combinations thereof).

In various embodiments, the hydrogel precursor can be a linear polysaccharide, such as chitosan, alginate or agarose or a branched polyethylene imine, a 4-armed polyethylene glycol or a 6-armed polyethylene glycol. In one embodiment, the hydrogel precursor is a thermally cross-linked hydrogel (e.g., agarose) and the process further comprises drying the wet gel prior to producing the densified ceramic solid.

In one embodiment the hydrogel precursor is a non-thermally cross-linked hydrogel (e.g., alginate, chitosan or a functionalized poly(ethylene glycol)) and the method does not include a drying step. In embodiments which do not include a drying step, process time to produce the densified ceramic solid is reduced at least 33%, such as up to 50% or more, as compared to a process which includes drying the wet gel. In one embodiment, the non-thermally cross-linked hydrogel is also a free-radical photopolymerizable hydrogel precursor (e.g., a functionalized poly(ethylene glycol)) and the gelling step is a photoinitated gelling step. In one embodiment, the functionalized poly(ethylene glycol) is dimethacrylate (PEG).

In one embodiment, the gelling step includes exposure of the template precursor solution to basic conditions.

In one embodiment, the oxide ceramic solid is selected from sodium cobalt oxide, lithium cobalt oxide, lithium manganese nickel oxide, calcium cobalt oxide, calcium cobalt oxide with rare earth doping, lithium titanium oxide, and combinations thereof.

In one embodiment, the oxide ceramic solid is a cubic garnet having an atomic formula comprising: $A_xR_yC_zS_aO_{12}$, wherein A is a first cationic species selected from H, Li, Na, Mg, Al, Sc and/or Ga and residing in an 8a, 16f, 32g, 24d, 48g or 96h site; R is a second cationic species selected from La, Ba and/or Ce and residing in a 24c site; and C is a third cationic species selected from Zr, Ta, Nb, Y or Hf and residing in the 16a site. In one embodiment, the cubic garnet has a nominal formula of $Li_7La_3Zr_2O_{12}$.

In one embodiment, a device is provided comprising any of the densified ceramic solids described herein. In one embodiment, the device is an energy storage device (e.g., battery, fuel cell, semi-fuel cell, and the like) or a thermoelectric device, such as a thermoelectric generator. In one embodiment, the device comprises at least one electrode which includes hydrogen, lithium, sodium, magnesium, aluminum or gallium.

In one embodiment, a method of making an electrolyte interface is provided comprising providing a slurry that includes an oxide ceramic compound having an atomic formula comprising: $A_xR_yC_zS_aO_{12}$, wherein A is a first cationic species selected from H, Li, Na, Mg, Al and/or Ga and residing in an 8a, 16f, 32g, 24d, 48g or 96h site; R is a second cationic species selected from La, Ba and/or Ce and residing in a 24c site; and C is a third cationic species selected from Zr, Ta, Nb, Y or Hf and residing in the 16a site; and providing an oxide ceramic electrolyte that includes a compound selected from $A_xR_yC_zS_aO_{12}$; forming at least one 3D feature on the oxide ceramic electrolyte, to provide an un-sintered electrolyte interface, wherein the 3D feature includes the slurry; and sintering the un-sintered electrolyte interface, to provide the electrolyte interface. In one embodiment, a device (e.g., battery, fuel cell, semi-fuel cell, and the like) is provided comprising the electrolyte interface described herein. In one embodiment, the device comprises at least one electrode that includes lithium or sodium or aluminum or magnesium.

The various embodiments described herein enable a new class of safe, durable, and low cost energy storage technology as well as thermoelectric devices (e.g., semiconductors). For example, in some embodiments, a battery, fuel cell, or semi-fuel cell that includes an oxide ceramic solid can be relatively air or water stable, allowing easier construction (e.g. avoiding the need for a dry room) and reducing packaging requirements. In one embodiment, the energy storage device comprises at least one electrode which includes hydrogen, lithium, sodium, magnesium, aluminum or gallium.

Although specific embodiments have been illustrated and described herein, it will be appreciated by those of ordinary skill in the art that any procedure that is calculated to achieve the same purpose may be substituted for the specific embodiments shown. For example, although the process has been discussed primarily with respect to ceramic solids, such as oxide ceramic solids, other materials can also be made and used, such as non-oxide materials, transition metal oxide materials and transition metal phosphates. Additionally, although the solvent discussed herein has focused primarily on a polar solvent, it is possible that non-polar solvents may also be useful herein. This application is intended to cover any adaptations or variations of the present subject matter. Therefore, it is manifestly intended that embodiments of this invention be limited only by the claims and the equivalents thereof.

What is claimed is:

1. A method comprising;
   producing a hydrogel template from a template precursor without a chelating agent, wherein the template precursor is a hydrogel precursor;
   simultaneously or subsequently entrapping a ceramic precursor solution in the hydrogel template, wherein molecular level mixing is achieved to produce a wet gel; and
   forming a densified ceramic solid from the wet gel.

2. The method of claim 1 wherein the method of forming the wet gel comprises:
   dissolving ceramic precursor components in a solvent to produce the ceramic precursor solution;
   combining the ceramic precursor solution with the hydrogel precursor to produce a solubilized hydrogel template comprising the hydrogel template containing the entrapped ceramic precursor solution; and
   gelling the solubilized hydrogel template to produce the wet gel comprising the hydrogel template containing the entrapped ceramic precursor solution.

3. The method of claim 2 further comprising providing a molecule to the ceramic precursor solution capable of providing steric hindrance to the hydrogel template.

4. The method of 2 wherein the solvent is a polar solvent.

5. The method of claim 3 wherein the ceramic precursor components are metal salts.

6. The method of claim 2 further comprising:
   pre-heating the wet gel to produce a pre-heated ceramic precursor mixture;
   milling the pre-heated ceramic precursor mixture to produce a pre-heated powder containing the ceramic precursor mixture; and
   solidifying the pre-heated powder to produce a pre-heated solid formation containing the ceramic precursor mixture.

7. The method of claim 6 further comprising:
   calcining the pre-heated solid formation containing the ceramic precursor mixture solution to produce a calcined ceramic solid formation;
   optionally milling the calcined ceramic solid formation to produce calcined ceramic powder; and
   densifying the calcined ceramic powder to produce the densified ceramic solid.

8. The method of claim 1 wherein the hydrogel precursor is a linear polysaccharide, a branched polyethylene imine, a 4-armed polyethylene glycol or a 6-armed polyethylene glycol.

9. The method of claim 8 wherein the linear polysaccharide is selected from chitosan, alginate and agarose.

10. The method of claim 1 wherein the hydrogel precursor is a thermally cross-linked hydrogel and the process further comprises drying the wet gel prior to producing the densified ceramic solid.

11. The method of claim 10 wherein the thermally cross-linked polymer is agarose.

12. The method of claim 1 wherein the hydrogel precursor is a non-thermally cross-linked hydrogel and the process does not include drying the wet gel prior to producing the densified ceramic solid.

13. The method of claim 12 wherein the non-thermally cross-linked hydrogel is alginate, chitosan or a functionalized poly(ethylene glycol).

14. The method of claim 12 wherein process time to produce the densified ceramic solid is reduced at least 33% as compared to a process which includes drying the wet gel prior to producing the densified ceramic solid.

15. The method of claim 14 wherein the non-thermally cross-linked hydrogel is also a free-radical photopolymerizable hydrogel precursor and the gelling step is a photoinitated gelling step.

16. The method of claim 15 wherein the free-radical photopolymerizable hydrogel precursor is a functionalized poly(ethylene glycol) (PEG).

17. The method of claim 16 wherein the functionalized poly(ethylene glycol) is dimethacrylate (PEG).

18. The method of claim 2 wherein the gelling step includes exposure of the ceramic precursor solution to basic conditions.

19. The method of claim 1 wherein the densified ceramic solid is an oxide ceramic solid.

20. The method of claim 19 wherein the oxide ceramic solid is a sodium cobalt oxide, lithium cobalt oxide, lithium manganese nickel oxide, calcium cobalt oxide, calcium cobalt oxide with rare earth doping, lithium titanium oxide, and combinations thereof or a cubic garnet having an atomic formula comprising:

$$A_x R_y C_z S_a O_{12},$$

wherein A is a first cationic species selected from H, Li, Na, Mg, Al, Sc and/or Ga and residing in an 8a, 16f, 32g, 24d, 48g or 96h site;
R is a second cationic species selected from La, Ba and/or Ce and residing in a 24c site; and
C is a third cationic species selected from Zr, Ta, Nb, Y or Hf and residing in the 16a site.

21. The method of claim 20 wherein the cubic garnet has a nominal formula of $Li_7La_3Zr_2O_{12}$.

22. The method of claim 1 wherein the method of forming the wet gel comprises:
gelling the hydrogel precursor to produce the hydrogel template;
dissolving ceramic precursor components in a solvent to produce the ceramic precursor solution; and
combining the ceramic precursor solution with the hydrogel template to produce a wet gel comprising the hydrogel template containing the entrapped ceramic precursor solution.

23. The method of claim 22 further comprising at least partially drying the hydrogel template prior to the combining step.

* * * * *

UNITED STATES PATENT AND TRADEMARK OFFICE
CERTIFICATE OF CORRECTION

PATENT NO.          : 10,388,975 B2
APPLICATION NO.     : 14/169758
DATED               : August 20, 2019
INVENTOR(S)         : Jeffrey Sakamoto et al.

Page 1 of 1

It is certified that error appears in the above-identified patent and that said Letters Patent is hereby corrected as shown below:

In the Specification

Column 4/Line 52: Error reads as "porosity" and should read as "porosity."

Column 11/Line 64: Error reads as "LCO}" and should read as "LCO)"

Column 12/Line 42: Error reads as "Al(NO$_3$)$_{3-9}$H$_2$O" and should read as "Al(NO$_3$)$_3$•9H$_2$O"

Column 13/Line 8: Error reads as "ceramic solid" and should read as "ceramic solid."

Column 14/Lines 22-23: Error reads as "A$_x$R$_y$C$_z$-S$_a$O$_{12}$" and should read as "A$_x$R$_y$C$_z$S$_a$O$_{12}$"

Column 15/Line 12: Error reads "overnight i.e." and should read as "overnight, i.e.,"

Signed and Sealed this
Eighth Day of October, 2019

Andrei Iancu
*Director of the United States Patent and Trademark Office*